United States Patent
Morioka et al.

(10) Patent No.: US 6,916,886 B2
(45) Date of Patent: Jul. 12, 2005

(54) PROPYLENE BLOCK COPOLYMER

(75) Inventors: Tetsuya Morioka, Tokyo (JP); Kazuya Sakata, Mie (JP); Toshihiko Sugano, Mie (JP); Masaaki Itou, Mie (JP); Yuu Hayakawa, Kanagawa (JP)

(73) Assignee: Japan Polypropylene Corporation, Tokyo (JP)

( * ) Notice: Subject to any disclaimer, the term of this patent is extended or adjusted under 35 U.S.C. 154(b) by 0 days.

(21) Appl. No.: 10/494,717
(22) PCT Filed: Sep. 26, 2002
(86) PCT No.: PCT/JP02/09962
§ 371 (c)(1), (2), (4) Date: May 6, 2004
(87) PCT Pub. No.: WO03/040204
PCT Pub. Date: May 15, 2003

(65) Prior Publication Data
US 2005/0009993 A1 Jan. 13, 2005

(30) Foreign Application Priority Data
Nov. 9, 2001 (JP) .................................. 2001-344258

(51) Int. Cl.⁷ ............................................. C08F 297/08
(52) U.S. Cl. .................................. 525/323; 525/268
(58) Field of Search .................. 525/323, 268

(56) References Cited

U.S. PATENT DOCUMENTS 5,322,902 A * 6/1994 Schreck et al. ............. 525/247

FOREIGN PATENT DOCUMENTS

| JP | 11-228612 | 8/1999 |
| JP | 11-349649 | 12/1999 |
| JP | 2001-181360 | 7/2001 |
| JP | 2001-310921 | 11/2001 |

* cited by examiner

Primary Examiner—Fred Teskin
(74) Attorney, Agent, or Firm—Oblon, Spivak, McClelland, Maier & Neustadt, P.C.

(57) ABSTRACT

To provide a propylene based block copolymer that, when used as a molding material, exhibits an extremely good stiffness-impact resistance balance and has good heat resistance and excellent moldability, and therefore, in molding, good appearance is revealed.

That is, the invention provides a propylene based block copolymer obtained through a preceding stage step of producing a propylene polymer component (PP) and a subsequent stage step of producing a propylene-ethylene copolymer component (EP) using a metallocene catalyst, wherein the block copolymer satisfies specific requisites.

3 Claims, 3 Drawing Sheets

PROPYLENE BLOCK COPOLYMER

TECHNICAL FIELD

The present invention relates to a propylene based block copolymer containing polypropylene and an ethylene-propylene copolymer having a specific structure. In more detail, the invention relates to a propylene based block copolymer that, when used as a molding material, exhibits an extremely good stiffness-impact resistance balance and has good heat resistance and excellent moldability.

BACKGROUND ART

Crystalline polypropylene is widely known in a variety of molding fields because it is excellent in mechanical property, chemical resistance, etc. However, when a propylene homopolymer is used as the crystalline polypropylene, stiffness is high, but impact resistance is insufficient. Thus, an improvement of the impact resistance has been carried out by a method of adding an elastomer such as ethylene-propylene rubbers to a propylene homopolymer or a method in which after homopolymerization of propylene, ethylene and propylene are subsequently copolymerized to produce a so-called block copolymer.

Although according to these methods, improvements of the physical properties are realized to considerable extent, a more improvement of the stiffness-impact resistance balance is desired. Also, in addition to these properties, an improvement for enhancing the heat resistance is eagerly desired.

On the other hand, it is known that isotactic polypropylene is obtained by polymerization of propylene using a metallocene based catalyst different from conventional Ziegler type catalyst systems. Also, it is known that after homopolymerization of propylene, ethylene and propylene are copolymerized using a similar catalyst, to produce a so-called block copolymer. These examples are described in, for example, JP-A-4-337308, JP-A-6-287257, JP-A-5-202152, JP-A-6-206921, and JP-A-10-219047.

Also, examples of propylene-ethylene block copolymers having high stiffness and impact resistance are described in JP-A-11-228648, JP-A-11-240929, JP-A-11-349649, and JP-A-11-349650.

According to the foregoing inventions, though the stiffness and impact resistance are more improved, not only still more improvements of the stiffness and impact resistance but also improvements in the points of heat resistance, etc. are necessary. Also, it is necessary to improve poor moldability caused by a narrow molecular weight distribution that is a general property of polymers produced using a metallocene based catalyst. In general, it is known that when large-sized molded articles such as bumpers are formed of a material having poor moldability by means of injection molding, a tiger stripe-like molding appearance defect (flow mark) is generated, and such a defect results in a problem of dropping a commercial value.

That is, with respect to the performance of propylene-ethylene block copolymers enumerated in the foregoing conventional technologies, though an enhancement of the impact resistance is observed to some extent, not only there is room for an improvement of the heat resistance as yet, but also an effect for improving the moldability is not substantially recognized. For those reasons, in propylene block copolymers obtained by the conventional methods, there were encountered problems of a more still stiffness-impact resistance balance and improvements of the heat resistance and moldability, especially an appearance such as flow mark.

DISCLOSURE OF THE INVENTION

For the sake of solving the problems in the foregoing conventional technologies, the present inventors made extensive and intensive investigations. As a result, it has been found that in the case where a propylene based block copolymer containing polypropylene having a specific structure and an ethylene-propylene copolymer having a specific structure in a specific proportion is used as a molding material, it has an extremely good stiffness-impact resistance balance and has high heat resistance and good moldability, leading to the invention.

Specifically, the gist of the invention resides in a propylene based block copolymer obtained through a preceding stage step of producing a propylene polymer component (PP) and a subsequent stage step of producing a propylene-ethylene copolymer component (EP), using a metallocene catalyst, wherein the block copolymer satisfies the following requisites (1) to (6).

(1) A melt flow rate (MFR) is from 0.1 to 150 g/10 min.
(2) A component that is insoluble in orthodichlorobenzene at 100° C. and soluble in orthodichlorobenzene at 140° C. has a propylene content of 99.5% by weight or more.
(3) The content of the propylene-ethylene copolymer component (EP) in the propylene based block copolymer is from 5 to 50% by weight.
(4) The ethylene content (G) of EP is from 15 to 65% by weight.
(5) When a ratio of a weight average molecular weight (Mw) to a number average molecular weight (Mn) of a highly crystalline polypropylene component in the propylene based block copolymer as determined by a cross fractionation method is defined as a Q value, a common logarithm of a molecular weight corresponding to a peak position of a molecular weight distribution curve of the highly crystalline polypropylene component is defined as P, common logarithms of molecular weights at positions of a 5% height of the peak height are defined as L and H (wherein L means a lower molecular weight side than the peak molecular weight, and H means a higher molecular weight side of the peak molecular weight), respectively, and α and β are defined as (α=H−P) and (β=P−L), respectively, the Q value and α/β satisfy the following relation:

a) (Q value)$\geq$2.3
b) α/β$\geq$0.4×(Q value)

(6) The block copolymer has a melting point of 157° C. or higher.

Another gist of the invention resides in a propylene based block copolymer satisfying the foregoing requisites (1) to (6) and the following requisite (7).

Requisite (7): The sum of the 2,1-bond content and the 1,3-bond content in the component that is insoluble in orthodichlorobenzene at 100° C. and soluble in orthodichlorobenzene at 140° C. is from 0.06 to 0.6% by mole.

Further, a still another gist of the invention resides in a propylene based block copolymer satisfying the foregoing requisites (1) to (6) and the following requisite (8). Requisite (8): The 1,3-bond content in the component that is insoluble in orthodichlorobenzene at 100° C. and soluble in orthodichlorobenzene at 140° C. is from 0.06 to 0.6% by mole.

Figure 1:
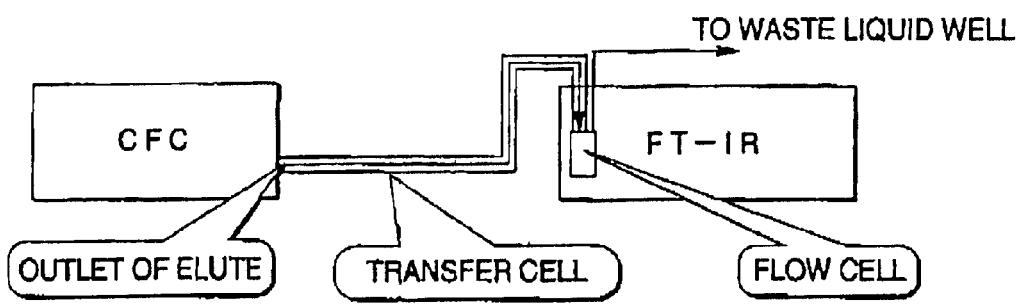
FIG. 1 is a conceptional flow diagram of CFC/FT-IR.

Incidentally, with respect to the reference numerals in the drawing, 1 denotes a liquid phase polymerization vessel; 2 denotes a slurry circulation pump; 3 denotes a liquid force classifier; 4 denotes a condenser; 5 denotes a counter-current pump; 6 denotes a degasification vessel; and 7 denotes a gas phase polymerization vessel.

BEST MODE FOR CARRYING OUT THE INVENTION

The invention will be described below in detail.

The propylene based block copolymer of the invention is a propylene based block copolymer obtained through a preceding stage step of producing a propylene polymer component (PP) and a subsequent stage step of producing a propylene-ethylene copolymer component (EP) using a metallocene catalyst, characterized in that the block copolymer satisfies the following requisites (1) to (6).

Requisite (1): Melt flow rate (MFR)

In the propylene based block copolymer of the invention, it is necessary that the MFR is in the range of from 0.1 to 150 g/10 min. In general, the higher the molecular weight, the lower the MFR value is, and therefore, the MFR is an approximate standard for expressing the magnitude of molecular weight. When the MFR is less than 0.1 g/10 min, the flowability at the time of resin molding processing lowers excessively so that a molding efficiency is reduced. Also, entanglement of the molecular chains is too strong, the growth rate of spherulites decreases. As a result, the crystallinity lowers, resulting in causing an inconvenience of a lowering of the stiffness. In contrast, when the MFR exceeds 150 g/10 min, the molecular weight becomes low excessively, resulting in an inconvenience of a lowering of the impact strength.

In the invention, the MFR is preferably in the range of from 4 to 100 g/10 min, and especially preferably from 5 to 50 g/10 min from both moldability and material properties of material. Also, recently, a market demand for high-speed molded articles and thin-wall molded articles (so-called high-flow products) is increasing. In the case of providing such materials, it is preferable that the MFR is from 50 to 150 g/10 min, especially from 70 to 150 g/10 min.

For adjusting the MFR, a hydrogen gas as a chain transfer agent is generally used. Besides, it is possible to control the MFR by the polymerization temperature, polymerization pressure, raw material composition ratio of monomer/comonomer, and combinations thereof. These conditions may possibly vary with respect to the control ranges depending upon the kind of a catalyst to be used.

Requisite (2): Component insoluble in orthodichlorobenzene (ODCB)

In the propylene based block copolymer of the invention, it is necessary that a component that is insoluble in ODCB at 100° C. and soluble in ODCB at 140° C. has a propylene content of 99.5% by weight or more. Such a component can be obtained by homopolymerizing propylene or copolymerizing it by adjusting the raw material gas composition so as to contain not more than 0.5% by weight of an α-olefin in the preceding stage step.

The insoluble component as referred to here in means a component that is insoluble in ODCB at 100° C. and is soluble in ODCB at 140° C., which is obtained by the known temperature-rising column fractionation method. The temperature-rising column fractionation method as referred to herein means a measurement method described in, for example, Macromolecules, 21, 314–319 (1988).

The measurement of the component insoluble in ODCB at 100° C. as defined in the invention is carried out in the following manner. That is, a glass bead support (from 80 to 100 mesh) is charged in a cylindrical column having a diameter of 50 mm and a height of 500 mm and kept at 140° C. Next, 200 mL of an ODCB solution (10 mg/mL) of a sample dissolved at 140° C. is introduced into the foregoing column. Thereafter, the temperature of the column is cooled to 40° C. at a cooling rate of 10° C./hr. After keeping at 40° C. for one hour, the column temperature is raised to 100° C. at a heating rate of 10° C./hr, followed by keeping for one hour. Incidentally, the precision of temperature control of the column throughout a series of operations is set up at ±1° C.

Next, 800 mL of ODCB at 100° C. is flown at a flow rate of 20 mL/min while keeping the column temperature at 100° C., thereby eluting a component dissolved in ODCB at 100° C. and present in the column and recovering it.

Next, the column temperature is raised to 140° C. at a heating rate of 10° C./min. After allowing to stand at 140° C. for one hour, the solvent (ODCB) at 140° C. is flown at a flow rate of 20 mL/min, thereby eluting a component that is insoluble in ODCB at 100° C. and soluble in ODCB at 140° C. and recovering it.

The ODCB solution containing a component that is insoluble in ODCB at 100° C. and soluble in ODCB at 140° C. is concentrated to 20 mL using an evaporator and then precipitated in a 5-fold amount of methanol. The precipitated polymer is recovered by filtration and then dried overnight in a vacuum oven. This is defined as a "component insoluble in ODCB at 100° C." in the invention.

ODCB is a good solvent for polyolefins, and its boiling point is high as 181° C., and therefore, it is used for solvent fractionation in a wide temperature range of from a low temperature to a high temperature. What it is insoluble in ODCB at 100° C. means the polypropylene component having high crystallizability among the components constituting the block copolymer and has a meaning of taking out only the highly crystalline component remaining after removal of the component having poor crystallizability from the propylene based block copolymer.

What the propylene content of the component is 99.5% by weight or more means that the component is homopolypropylene, or even when the component is a copolymer of propylene and an α-olefin, the copolymer contains the α-olefin in an extremely small amount of not more than 0.5% by weight. Accordingly, it is meant that the component insoluble in ODCB at 100° C. has high crystallizability and has an effect for enhancing the stiffness of the propylene based block copolymer. Since the polymer is completely dissolved at 140° C., the value of 140° C. has a meaning that the whole amount of the component insoluble in ODCB at 100° C. can be recovered and provided for analysis of its propylene content.

In the invention, when the propylene content of the foregoing ODCB-insoluble component is less than 99.5% by weight, the stiffness and heat resistance lower, and therefore, such is not preferable. For the sake of keeping high stiffness, it is more preferable that the component is homopolypropylene.

Also, it is preferable that the component is contained in an amount of 45% by weight or more, especially from 60 to 90% by weight in the propylene based block copolymer.

Requisite (3): EP content in propylene based block copolymer

In the propylene based block copolymer of the invention, it is necessary that the weight proportion of the propylene-ethylene copolymer component occupying therein is from 5 to 50% by weight. In order that the weight proportion may fall within this range, the weight of PP produced in the preceding stage step and the weight of EP produced in the subsequent stage step may be set up at a prescribed proportion. In general, in the propylene based block copolymer, the propylene-ethylene copolymer is a random copolymer, and a substance having poor crystallizability and exhibiting physical properties such as rubbers is the major component and becomes a basis factor revealing impact-resistant strength. In the invention, since the propylene-ethylene copolymer has high randomness, it exhibits excellent physical properties in the wide range of the EP content of from 5 to 50% by weight. When the EP content is less than 5% by weight, the amount of a rubber-like portion is too small, resulting in causing an inconvenience of a lowering of the impact strength. In contrast, when it exceeds 50% by weight, the amount of a crystalline portion is too small, resulting in causing a problem of lowering of the stiffness.

In the invention, the EP content is preferably in the range of from 8 to 40% by weight, and especially preferably from 10 to 30% by weight. The definition and measurement method of the EP content in the propylene based block copolymer as the subject matter of the invention will be further described later in detail.

Requisite (4): Ethylene content (G) of EP

In the propylene based block copolymer of the invention, it is necessary that the ethylene content (G) in EP is from 15 to 65% by weight, and preferably from 20 to 55% by weight. The measurement method of G will be described later.

G is a factor influencing the crystallizability and elastometric characteristics of the propylene-ethylene copolymer. In particular, G greatly influences the impact-resistance at low temperatures of not higher than room temperature, especially at very low temperatures of from −10 to −30° C. When G is less than 15% by weight, the glass transition temperature of EP becomes high, resulting in causing an inconvenience of a lowering of the impact strength at low temperatures. Also, a phenomenon where a part of EP becomes miscible to PP matrix occurs and an inconvenience of a lowering of the stiffness and heat resistance. On the other hand, when G exceeds 65% by weight, EP is not uniformly dispersed in PP so that the impact strength lowers. The ethylene content (G) of EP can be controlled at a desired value within the range defined in the invention by adjusting the raw material gas composition ratio in the production step of the propylene-ethylene block copolymer in the subsequent stage step.

Requisite (5): Q value and relation between Q value and $\alpha/\beta$

In the propylene based block copolymer of the invention, it is necessary that when a ratio of a weight average molecular weight (Mw) to a number average molecular weight (Mn) of a highly crystalline polypropylene component in the propylene based block copolymer as determined by the cross fractionation method is defined as a Q value, a common logarithm of a molecular weight corresponding to a peak position of a molecular weight distribution curve of the highly crystalline polypropylene component is defined as P, common logarithms of molecular weights at positions of a 5% height of the peak height are defined as L and H (wherein L means a lower molecular weight side than the peak molecular weight, and H means a higher molecular weight side of the peak molecular weight), respectively, and $\alpha$ and $\beta$ are defined as ($\alpha$=H−P) and ($\beta$=P−L), respectively, the Q value and $\alpha/\beta$ satisfy the following relation:

a) (Q value)$\geq$2.3 b) $\alpha/\beta \geq 0.4 \times$(Q value)

In general, in injection molding, when the MFR becomes high, the moldability is enhanced, and appearance defects such as flow mark hardly occur. However, when the MFR is too high, the impact strength lowers so that a sufficient performance as a molding material cannot be exhibited. Also, in order to increase the impact strength, when the MFR is made low, appearance defects such as flow mark become remarkable, thereby damaging the commercial value. Accordingly, it was required to keep the MFR and impact strength at fixed levels and improve the moldability.

In the case where the Q value of the highly crystalline polypropylene component is smaller than 2.3, effects for improving the flowability and moldability, especially flow mark are not recognized. Also, even in the case where the Q value is 2.3 or more, when the $\alpha/\beta$ value is smaller than [0.4×(Q value)], the stiffness-impact resistance balance is deteriorated though the effect for improving the moldability is revealed.

The "highly crystalline polypropylene component" in the propylene based block copolymer of the invention means a component that, when measured by cross fractional chromatography described later, is not eluted in ODCB at 100° C. but dissolved and eluted in ODCB at 140° C. In the propylene based block copolymer of the invention, any of a rubber component, an atactic polypropylene component, a component having crystallizability based on the ethylene chain, and a component not having high crystallizability in PP are eluted at a temperature not higher than 100° C., and only the highly crystalline polypropylene component is eluted at 140° C. In general, it is known that for the sake of improving the moldability, it is useful to broaden the molecular weight distribution. The present inventors made extensive and intensive investigations. As a result, it has been found that for the sake of improving the moldability, it is important to broaden the molecular weight distribution of the highly crystalline polypropylene component. The Q value is a well-known parameter as an index for the breadth of the molecular weight distribution, and as the Q value becomes large, the molecular weight distribution broadens. As the Q value becomes small, the molecular weight distribution becomes narrow so that not only the moldability is deteriorated, but also the dispersibility of rubber is adversely affected. In particular, when the Q value is less than 2.3, the molecular weight distribution is too narrow so that the moldability becomes extremely worse.

Though the Q value is a general index representing the breadth of the molecular weight distribution, it cannot be an index with respect to the shape of the molecular weight distribution. According to the investigations of the present inventor, the mechanical properties, especially a balance between the stiffness and the impact resistance of the propylene based block copolymer largely changes depending upon the shape of the molecular weight distribution curve of the highly crystalline propylene component, and when the Q value is increased, the moldability is improved. However, as a result of increasing the Q value, in the case where a tail on the low molecular weight side becomes enlarged, the amount of the low molecular weight component that is not preferable in view of the mechanical properties increases, whereby the stiffness-impact resistance balance is deteriorated. The highly crystalline propylene component constitutes a matrix component in the block copolymer and is an important component of not only bearing the stiffness of the material but also forming a craze due to the impact to absorb energy. Accordingly, for the sake of improving the moldability while keeping the good mechanical physical properties, it is important that in broadening the molecular weight distribution of the highly crystalline propylene component, the tail on the low molecular weight side is suppressed, but the tail is enlarged to the high molecular weight side. α/β is an index representing a proportion in intensity of the tail on to the high molecular weight side to the tail on to the low molecular weight side. It is meant that when a is large, the tail on the high molecular weight side is enlarged, whereas when it is small, the tail on the low molecular weight side vigorously occurs.

In the case where the same degree of tail on each of the high molecular weight side and the low molecular weight side occurs, α/β is 1. Also, Keeping α/β to be a certain value or more is not enough to suppress the tail on the low molecular weight side. As the Q value is increased, the amount of the low molecular weight component inevitably increases. Accordingly, when the Q value is large, an increase of the ratio of the low molecular weight component to the high molecular weight component must be suppressed by increasing the α/β ratio to strengthen the tail on the high molecular weight side. The necessary condition that α/β and the Q value must satisfy, both which are empirically obtained by investigations of the present inventor, is [α/β≧0.4×(Q value)].

<How to determine the parameters of requisites (3) to (5)>

In the invention, the EP content in the propylene based block copolymer, the ethylene content (G) in EP, and the Q value, α and β of the highly crystalline propylene component are determined by the following methods.

1. Analitical instruments to be used:
(1) Cross fractionation chromatograph:
  CFC T-100 manufactured by DIA Instruments Co., Ltd. (hereinafter abbreviated as "CFC")
(2) Fourier transform infrared absorption spectroscopy:
  FT-IR, 1760x manufactured by Perkin Elmer, Inc.
  A fixed wavelength infrared spectrophotometer installed as a detector of CFC is taken off, and instead thereof, FT-IR is connected and used as the detector. A transfer line from an outlet of the solution eluted from CFC to FT-IR is set up so as to have a length of 1 m and kept at a temperature of 140° C. throughout the measurement. As a flow cell installed in FT-IR, one having an optical path length of 1 mm and an optical path width of 5 mmφ is used and kept at a temperature of 140° C. throughout the measurement.
(3) Gel permeation chromatography (GPC):
  As a GPC column in the subsequent stage portion of CFC, three columns of AD806MS manufactured by Showa Denko K.K. are connected in series and used.

2. Measurement condition of CFC:
(1) Solvent: Orthodichlorobenzene (ODCB)
(2) Sample concentration: 4 mg/mL
(3) Injection amount: 0.4 mL
(4) Crystallization: The temperature is decreased from 140° C. to 40° C. over about 40 minutes.
(5) Fractionation method:
  The fractionation temperature at the time of temperature-rising elution fractionation is fixed at 40, 100 and 140° C., and the sample is fractionated into three fractions in total. Incidentally, the eluted portion (unit: % by weight) of a component eluted at not higher than 40° C. (fraction 1), a component eluted at from 40 to 100° C. (faction 2), and a component eluted at from 100 to 140° C. (fraction 3) is defined as $W_{40}$, $W_{100}$ and $W_{140}$, respectively. ($W_{40}+W_{100}+W_{140}$) is equal to 100. Also, after passing through the GPC columns of the subsequent stage, each of the fractionated fractions is automatically transported to the FT-IR spectrometer as it is.
(6) Solvent flow rate at the time of elution: 1 mL/min 3. Measurement condition of FT-IR:
  After the elution of the sample solution from GPC of the subsequent stage of CFC is started, the FT-IR measurement is carried out under the following condition, and GPC-IR data with respect to the foregoing respective fractions 1 to 3 are collected.

A conceptional diagram of CFC/FT-IR is shown in FIG. 1.
(1) Detector: MCT
(2) Resolution: 8 $cm^{-1}$
(3) Measurement interval: 0.2 minutes (12 seconds)
(4) Number of scans per measurement: 15 times 4. Post treatment and analysis of measurement results:
  The elution amount and molecular weight distribution of the component eluted at each temperature are determined using an absorbance at 2,945 $cm^{-1}$ obtained by FT-IR as a chromatogram. The elution amount is standardized such that the sum of the elution amounts of the respective eluting components is 100%. Conversion from the retention volume to the molecular weight is carried out using a calibration curve previously prepared with standard polystyrene.

Standard polystyrenes to be used are the following brand-name merchandises manufactured by Tosoh Corporation: F380, F288, F128, F80, F40, F20, F10, F4, F1, A5000, A2500 and A1000.

0.4 mL of a solution prepared by dissolving 0.5 mg/mL of each standard polystyrene in ODCB (containing 0.5 mg/mL of BHT (2,6-di-t-butyl-4-methylphenol) is injected to prepare a calibration curve. The calibration curve employs a cubic expression obtained by approximation by the least squares method. The conversion to the molecular weight employs a universal calibration curve by referring to Sadao Mori, *Size Exclusion Chromatography* (Kyoritsu Shuppan). For the viscosity expression used herein ($[\eta]=K\times M^\alpha$), the following numerical values are used.

(1) At the time of preparation of calibration curve using standard polystyrene:
  K=0.000138, α=0.70
(2) At the time of measurement of a sample of propylene based block copolymer:
  K=0.000103, α=0.78

The ethylene content distribution of each of the eluting components (distribution of the ethylene content along the molecular weight axis) is determined by conversion to an ethylene content (% by weight) using a ratio of an absorbance at 2,956 $cm^{-1}$ to an absorbance at 2,927 $cm^{-1}$ obtained by GPC-IR from a calibration curve previously prepared using polyethylene, polypropylene, ethylene-propylene rubber (EPR) whose ethylene content is known by the $^{13}C$-NMR measurement or the like, and mixtures thereof.

<EP content>

In the invention, the EP content of the propylene based block copolymer is defined according to the following equation (I) and determined by the following procedures.

$$\text{EP content}(\% \text{ by weight}) = W_{40} \times A_{40}/B_{40} + W_{100} \times A_{100}/B_{100} \quad \text{(I)}$$

$W_{40}$ and $W_{100}$ each represents an elution proportion (unit: % by weight) at each of the foregoing fractions; $A_{40}$ and $A_{100}$ each represents an average ethylene content (unit: % by weight) measured at each of the fractions corresponding to $W_{40}$ and $W_{100}$, respectively; and $B_{40}$ and $B_{100}$ each represents an ethylene content (unit: % by weight) of EP contained in each of the fractions. How to determine $A_{40}$, $A_{100}$, $B_{40}$, and $B_{100}$ will be described later.

The meanings of the equation (I) are as follows. That is, the first term in the right of the equation (I) is a term for calculating the amount of EP contained in the fraction 1 (portion soluble at 40° C.). In the case where the fraction 1 contains only EP but does not contain PP, W40 contributes to the EP content derived from the fraction 1 occupying in the whole as it is. However, since the fraction 1 contains a small amount of PP-derived components (a component having an extremely low molecular weight and atactic polypropylene) in addition to the EP-derived component, it is necessary to correct that portion. Thus, by multiplying $W_{40}$ by $A_{40}/B_{40}$, the amount derived from the EP component in the fraction 1 is calculated. For example, in the case where the average ethylene content ($A_{40}$) of the fraction 1 is 30% by weight, and the ethylene content ($B_{40}$) of EP contained in the fraction 1 is 40% by weight, $30/40 = 3/4$ (i.e., 75% by weight) of the fraction 1 is derived from EP, and ¼ is derived from PP. In this way, the operation of multiplication by $A_{40}/B_{40}$ in the first term in the right means the calculation of the contribution of EP from the weight percent ($W_{40}$) of the fraction 1. The second term in the right is also the same. With respect to the respective fractions, one obtained by calculating the contribution of EP and adding it is the EP content.

(1) As described above, the average ethylene content corresponding to the fractions 1 to 2 obtained by the CFC measurement is defined as $A_{40}$ and $A_{100}$, respectively (any of the units are % by weight). How to determine the average ethylene content will be described later.

(2) The ethylene content corresponding to the peak position in the molecular weight distribution curve of the fraction 1 (see FIG. 2) is defined as $B_{40}$ (unit: % by weight). As to the fraction 2, it is considered that the rubber portion is all eluted at 40° C., and the ethylene content cannot be defined in the same manner. Accordingly, in the invention, the ethylene content is defined as $B_{100}=100$. $B_{40}$ and $B_{100}$ each represents an ethylene content of EP contained in each of the fractions, but it is substantially impossible to analytically determine this value: This is because there is no means for completely fractionating and recovering PP and EP contained in the fraction. As a result of investigations using a variety of model samples, it has been found that as to $B_{40}$, when the ethylene content corresponding to the peak position of the molecular weight distribution curve of the fraction 1 is used, it is possible to well explain an improving effect on material properties. Also, from two reasons that $B_{100}$ has crystallizability derived from the ethylene sequence and that the amount of EP contained in these fractions is relatively small as compared with the amount of EP contained in the fraction 1, the case where $B_{100}$ is approximated to 100 is close to the actual and does not substantially cause an error in the calculation. Thus, the analysis is carried out on the assumption of $B_{100}=100$.

(3) The EP content is determined according to the following equation.

$$\text{EP content (\% by weight)} = W_{40} \times A_{40}/B_{10} + W_{100} \times A_{100}/100 \quad (II)$$

Namely, ($W_{40} \times A_{40}/B_{40}$) as the first term in the right of the equation (II) represents the content (% by weight) of EP not having crystallizability; and ($W_{100} \times A_{100}/100$) as the second term represents the content (% by weight) of EP having crystallizability.

Here, the average ethylene contents $A_{40}$ and $A_{100}$ of each of the fractions 1 and 2 obtained from $B_{40}$ and the CFC measurement are determined in the following manner.

Figure 2:
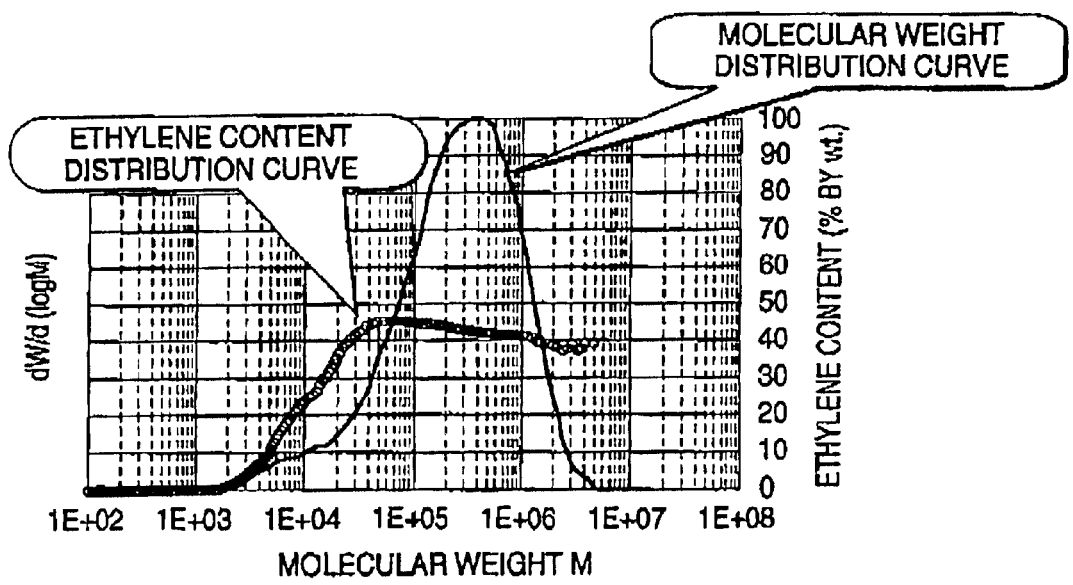
FIG. 2 is a diagram showing the analysis results of GPC/FT-IR of a fraction 1.

FIG. 2 shows examples of a curve of a measured molecular weight distribution of the fraction 1 fractionated by a difference in the crystal distribution by the GPC column constituting a part of the CFC analyzer, and a distribution curve of the ethylene content measured corresponding to the molecular weight distribution curve by FT-IR connected after the GPC column. The ethylene content corresponding to the peak position of the molecular weight distribution curve is $B_{40}$.

Also, in FIG. 2, the sum of a product of the weight proportion of every data point and the ethylene content of every data point acquired as a data point in the measurement becomes the average ethylene content $A_{40}$ of the fraction 1. The average ethylene content $A_{100}$ of the fraction 2 is determined in the same manner.

Incidentally, the meanings of setting up the three kinds of the fractionation temperature are as follows. In the CFC analysis of the invention, it is meant that "40° C." is a temperature condition necessary and sufficient for fractionating only polymers not having crystallizability (for example, the majority of EP, or a component having an extremely low molecular weight and an atactic component in the propylene polymer component (PP)). It is meant that "100° C." is a temperature necessary and sufficient for eluting only the component that is insoluble at 40° C. and becomes soluble at 100° C. (for example, a component having crystallizability derived from the ethylene and/or propylene sequence in EP and PP having low crystallizability). It is meant that "140° C." is a temperature necessary and sufficient for eluting only the component that is insoluble at 100° C. and becomes soluble at 140° C. (for example, a component having especially high crystallizability in PP and a component having an extremely high molecular weight and extremely high ethylene crystallizability in EP) and recovering the whole amount of the propylene based block copolymer to be used for the analysis. Incidentally, since the EP component is not at all contained in $W_{140}$, or even when it is present, its amount is extremely small and substantially negligible, $W_{140}$ is excluded from the calculation of the EP content and G.

<G value>

Ethylene Content (G) in EP (% by Weight) ($W_{40} \times A_{40} + W_{100} \times A_{100}$)/[EP]

In the equation, [EP] is the previously determined EP content (% by weight).

<Q value, α and β of highly crystalline polypropylene component>

The Q value, α and β are determined from the foregoing molecular weight distribution curve of the fraction 3 of CFC (component that is insoluble at 100° C. and is eluted at 140° C.). A method of calculating the weight average molecular weight (Mw) and the number average molecular weight (Mn) from the molecular weight distribution curve of the fraction 3 is according to the known method, and Mw/Mn is defined as Q value. α and β are determined in the following procedures.

(1) P, a common logarithm of the molecular weight giving a peak of the molecular weight distribution curve of the fraction 3, is determined.

(2) A common logarithm of the molecular weight at a 5% height of the peak height of the molecular weight distribution curve is determined. The molecular weight giving a 5% height is present in both the high and the low molecular weight side of the peak of the molecular weight distribution curve. Of these, a common logarithm of the molecular weight in the low molecular weight side is defined as L, and a common logarithm of the molecular weight in the high molecular weight side is defined as H.

(3) α and β are calculated while defining as (a=H−P) and (β=P−L), respectively.

Figure 3:
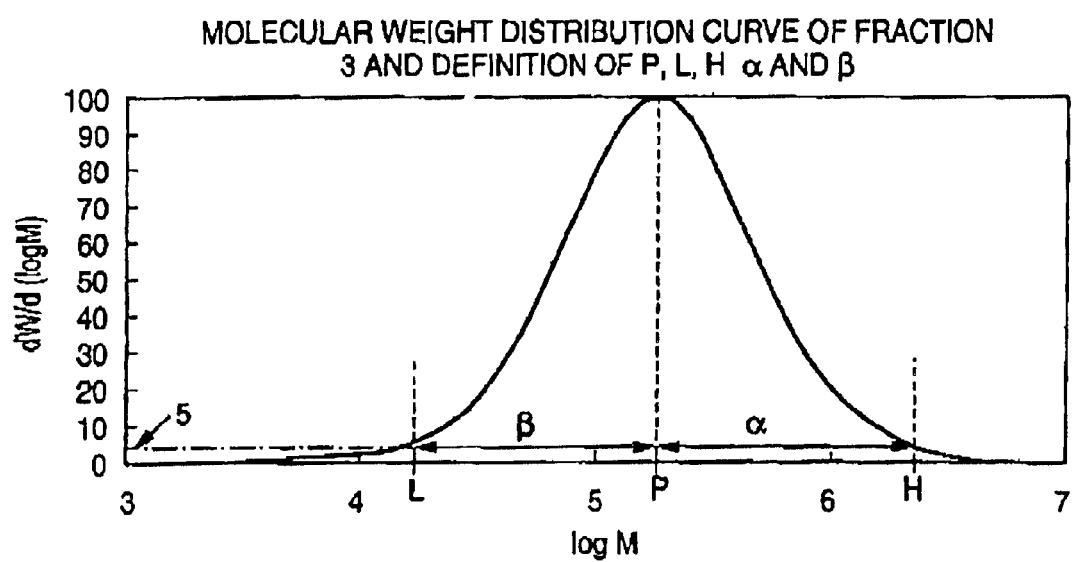
FIG. 3 is a diagram showing the molecular weight distribution of a fraction 3 and P, L and H and α and β.

Incidentally, FIG. 3 shows an example of the molecular weight distribution curve of the fraction 3 and P, L and H and α and β in that example.

Requisite (6): Melting point of propylene based block copolymer

It is necessary that the propylene based block copolymer of the invention has a melting point of 157° C. or higher. When the melting point is lower than 157° C., the heat resistance and stiffness are insufficient. In order to obtain such a propylene based block copolymer having a high melting point, a metallocene catalyst, a co-catalyst, a polymerization condition, and the like are properly combined and used. In general, in many cases, the foregoing can be achieved by increasing the polymerization pressure and/or decreasing the polymerization temperature. Also, it can be achieved by using a combination of the catalyst components (A) to (C) disclosed in the invention.

In the case of the propylene based block copolymer, the melting point of the product is dominated by the propylene polymer component (PP). Accordingly, it can be said that the melting point of the block copolymer is approximately a melting point of PP, and the polymerization reaction in the preceding stage step is dominant.

Requisite (7): Content of regio irregular bonds

In the invention, it is preferable that the ODCB-insoluble component of the propylene based block copolymer contains a specific amount of regio irregular bonds (regio-irregular units based on 2,1-insertion and 1,3-insertion of propylene). In the invention, it is preferable that the sum of the 2,1-bond content and the 1,3-bond content is from 0.06 to 0.6% by mole. The foregoing bond content is measured by $^{13}$C-NMR.

<Details of measurement method by $^{13}$C-NMR>

In a 10-mmφ sample tube for NMR, a sample of from 350 to 500 mg is completely dissolved in a solvent of about 2.0 mL of ODCB having about 0.5 mL of deuterated benzene as a lock solvent added thereto at 130° C. and then measured at 130° C. by a proton complete decoupling method. As the measurement condition, a flip angle of 65° and a pulse interval of 5 T1 or more (T1 is the longest value of spin-lattice relaxation times among methyl groups) are chosen. In the propylene polymer, since T1 of a methylene groups and a methine groups is shorter than that of the methyl groups, the recovery of magnetization of all carbons is 99% or more under this measurement condition.

From the spectrum measured under the foregoing condition, the 2,1-bond content and 1,3-bond content are determined according to the following equations.

$$2,1\text{-Bond content (\% by mole)} = \frac{\{[A(1)+A(2)+A(3)+A(4)+A(5)+A(6)]/6\}}{\text{(Sum of integrated values at from 27 to 48 ppm)}} \times 1000 \times 1/5$$

$$1,3\text{-Bond content (\% by mole)} = \frac{\{[A(7)+A(8)+A(9)]/6\}}{\text{(Sum of integrated values at from 27 to 48 ppm)}} \times 1000 \times 1/5$$

In these equations, A(1), A(2), A(3), A(4), A(5), A(6), A(7), A(8), and A(9) represent an area at 42.3 ppm, 35.9 ppm, 38.6 ppm, 30.6 ppm, 36.0 ppm, 31.5 ppm, 31.0 ppm, 37.2 ppm, and 27.4 ppm, respectively and an existent ratio of carbons in the following partial structures (I) and (II).

energy; and that when the content of regio irregular bonds is less than 0.06% by mole, an effect for forming such a segment having high mobility is small so that the impact strength lowers. On the other hand, the regio irregular bonds become a defect when polypropylene forms a crystal and have an effect for lowering the stiffness. In particular, when the content of regio irregular bonds exceeds 0.6% by mole, a lowering of the crystallinity becomes abrupt, and at the same time, the thickness of a crystal lamella becomes thin, resulting in a lowering of the stiffness or heat resistance.

Incidentally, it is possible to make the content of regio irregular bonds fall within the range defined in the invention by selecting an adequate metallocene complex or adequately combining a metallocene complex and a co-catalyst. Also, it is possible to make it fall within the range defined in the invention by performing the polymerization at an adequate polymerization temperature and/or selecting an adequate polymerization pressure. So far as a general tendency of fluctuation is concerned, when the polymerization temperature is raised, the 1,3-bond content increases, and when the polymerization pressure is increased, the 2,1-bond content increases.

Requisite (8): 1,3-Bond content

In the propylene based block copolymer of the invention, it is preferable that the 1,3-bond content in the ODCB-insoluble component is from 0.06 to 0.6% by mole. When the subject content is 0.06% by mole or more, the mobility of an amorphous component is enhanced, and as a result, the effect for improving the impact strength becomes more remarkable. However, in the case where the subject content exceeds 0.6% by mole, a lowering of the crystallinity becomes large, resulting in a lowering of the stiffness or heat resistance. Among those containing regio irregular bonds, the segment containing a 1,3-bond is higher in mobility than the segment containing a 2,1-bond, and therefore, the former is excellent in the effect for enhancing the impact resistance.

Incidentally, it is possible to make the 1,3-bond content fall within the range defined in the invention by selecting an adequate metallocene complex or adequately combining a metallocene complex and a co-catalyst. Also, it is possible to make it fall within the range defined in the invention by performing the polymerization at an adequate polymerization temperature and/or selecting an adequate polymerization pressure.

<Production of propylene based block copolymer>

The method of producing the propylene based block copolymer according to the invention is not particularly

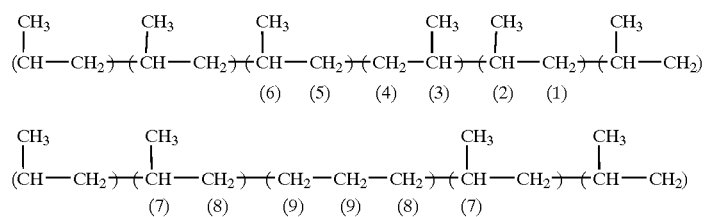

The reason why the degree of enhancement of the impact strength lowers unless the content of regio irregular bonds is 0.06% by mole is not clear, but it may be estimated that since a high-molecular segment containing regio irregular bonds is higher in mobility than a segment containing no regio irregular bond, when the former receives an impact, it causes local plastic deformation so that it can absorb larger impact limited so far as it gives propylene based block copolymers satisfying the foregoing physical properties. In this regard, a catalyst system suitable for producing the copolymer of the invention is a specific metallocene catalyst, and an olefin polymerization catalyst obtained by bringing the following components A, B and C into contact with each other can be used.

<Component (A)>

A transition metal compound component (A) is represented by the following general formula (Ia).

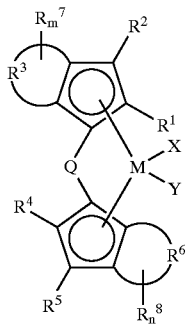

General Formula (Ia)

In the general formula (Ia), $R^1$, $R^2$, $R^4$, and $R^5$ each independently represents a hydrogen atom, a hydrocarbon group having from 1 to 10 carbon atoms, a silicon-containing hydrocarbon group having from 1 to 12 carbon atoms, or a halogenated hydrocarbon group having from 1 to 12 carbon atoms; $R^3$ and $R^6$ each independently represents a saturated or unsaturated divalent hydrocarbon group having from 3 to 10 carbon atoms, capable of forming a fused ring against the 5-membered ring to which it bonds; $R^7$ and $R^8$ each independently represents an aryl group having from 6 to 20 carbon atoms or a halogen- or halogenated hydrocarbon-substituted aryl group having from 6 to 20 carbon atoms; Q represents a binding group capable of crosslinking the two conjugated 5-membered ring ligands at an arbitrary position; M represents a metal atom selected from the Groups 4 to 6 of the Periodic Table; X and Y each represents a hydrogen atom, a halogen atom, a hydrocarbon group, an alkoxy group, an amino group, a phosphorus-containing hydrocarbon group, or a silicon-containing hydrocarbon group; and $\underline{m}$ and $\underline{n}$ each means the number of the respective substituents $R^7$ and $R^8$ substituted on the secondary ring and each independently represents an integer of from 0 to 20.

In the case where the transition metal compound of the invention is an antipode, it is preferably a racemate.

Specific examples of the hydrocarbon group having from 1 to 10 carbon atoms represented by the foregoing $R^1$, $R^2$, $R^4$, and $R^5$ include alkyl groups such as methyl, ethyl, n-propyl, isopropyl, n-butyl, isobutyl, sec-butyl, t-butyl, n-pentyl, n-hexyl, cyclopropyl, cyclopentyl, and cyclohexyl; alkenyl groups such as vinyl, propenyl, and cyclohexenyl; a phenyl group; and a naphthyl group.

Specific examples of the silicon-containing hydrocarbon group having from 1 to 12 carbon atoms represented by the foregoing $R^1$, $R^2$, $R^4$, and $R^5$ include trialkylsilyl groups such as trimethylsilyl, triethylsilyl, and t-butyldimethylsilyl; and alkylsilylalkyl groups such as bis(trimethylsilyl)-methyl.

In the foregoing halogenated hydrocarbon group having from 1 to 12 carbon atoms, examples of halogen atoms include a fluorine atom, a chlorine atom, a bromine atom, and an iodine atom. In the case where the halogen atom is a fluorine atom, the foregoing halogenated hydrocarbon group is a compound wherein the fluorine atom is substituted at an arbitrary position on the foregoing hydrocarbon group. Specific examples thereof include fluoromethyl, difluoromethyl, trifluoromethyl, chloromethyl, dichloromethyl, trichloromethyl, bromomethyl, dibromomethyl, tribromomethyl, iodomethyl, 2,2,2-trilfuoroethyl, 2,2,1,1-tetrafluoroethyl, pentafluoroethyl, pentachloroethyl, pentafluoropropyl, nonafluorobutyl, trifluorovinyl, o-, m- or p-fluorophenyl, o-, m- or p-chlorophenyl, o-, m- or p-bromophenyl, 2,4-, 3,5-, 2,6- or 2,5-difluorophenyl, 2,4-, 3,5-, 2,6- or 2,5-dichlorophenyl, 2,4,6-trifluorophenyl, 2,4,6-trichlorophenyl, pentafluorophenyl, and pentachlorophenyl.

Of these, $R^1$ and $R^4$ are each preferably a hydrocarbon group having from 1 to 6 carbon atoms, such as methyl, ethyl, propyl, butyl, and phenyl; and $R^2$ and $R^5$ are each preferably a hydrogen atom. As $R^3$ and $R^6$, the case where the secondary ring formed therefrom together with a common portion of the adjacent conjugated 5-membered rings is a 7- to 10-membered ring is preferable, and a pentamethylene group, a 1,3-pentadienylene group, and a 1,4-pentdienylene group are especially preferable.

Preferred specific examples of the aryl group having from 6 to 20 carbon atoms represented by $R^7$ and $R^8$ include aryl groups such as a phenyl group, a methylphenyl group, a dimethylphenyl group, a mesityl group, an ethylphenyl group, a diethylphenyl group, a triethylphenyl group, an isopropylphenyl group, a diisopropylphenyl group, a triisopropylphenyl group, an n-butylphenyl group, a di-n-butylphenyl group, a tri-n-butylphenyl group, a t-butylphenyl group, a di-t-butylphenyl group, a tri-t-butylphenyl group, a biphenylyl group, a p-terphenyl group, an m-terphenyl group, a naphthyl group, an anthryl group, and a phenanthryl group. Of these, a t-butylphenyl group, a biphenylyl group, a p-terphenyl group, a naphthyl group, an anthryl group, and a phenanthryl group are especially preferable.

As the halogen- or halogenated hydrocarbon-substituted aryl group having from 6 to 20 represented by $R^7$ and $R^8$, the case where the halogen is fluorine, chlorine, or bromine can be enumerated. As specific examples, in the case where the halogen atom is, for example, a fluorine atom, compounds wherein the fluorine atom is substituted at an arbitrary position on the foregoing hydrocarbon group can be enumerated. Specific examples of the case of fluorine include a fluorophenyl group, a (trifluoromethyl)phenyl group, a methylfluorophenyl group, a fluorodimethylphenyl group, a (fluoromethyl)methylphenyl group, an ethylfluorophenyl group, a diethylfluorophenyl group, a triethylfluorophenyl group, a fluoroisopropylphenyl group, a fluorodiisopropylphenyl group, a (fluoroisopropyl)isopropylphenyl group, a fluorotriisopropylphenyl group, an n-butylfluorophenyl group, a di-n-butylfluorophenyl group, a (fluorobutyl)butylphenyl group, a tri-n-butylfluorophenyl group, a t-butylfluorophenyl group, a di-t-butylfluorophenyl group, a tri-t-butylfluorophenyl group, a fluorobiphenylyl group, a fluoro-p-terphenyl group, a fluoro-m-terphenyl group, a fluoronaphthyl group, a fluoroanthryl group, and a fluorophenanthryl group. As the halogenated hydrocarbon group, preferred examples of fluorides include a fluorinated hydrocarbon-substituted aryl group, and preferred examples of chlorides include a chlorinated hydrocarbon-substituted aryl group. Of these, a t-butylfluorophenyl group, a fluorobiphenylyl group, a fluoro-p-terphenyl group, a fluoronaphthyl group, a fluoroanthryl group, a fluorophenanthryl group, a t-butylchlorophenyl group, a chlorobiphenylyl group, a chloro-p-terphenyl group, a chloronaphthyl group, a chloroanthryl group, and a chlorophenanthryl group are especially preferable.

$\underline{m}$ and $\underline{n}$ each independently represents an integer of from 1 to 5. In the case where $\underline{m}$ and/or $\underline{n}$ is an integer of 2 or more, a plurality of the groups $R^7$ (or $R^8$) may be the same or different. Also, in the case where $\underline{m}$ and/or $\underline{n}$ is 2 or more, R$^7$s or R$^8$s may be connected to each other to form a new ring structure. The bonding position of R$^7$ to R$^3$ or of R$^8$ to R$^6$ is not particularly limited, but it is preferable that each substituent is bonded to carbon adjacent to the 5-membered ring (carbon at the α-position).

Q is preferably a methylene group, an ethylene group, a silylene group, an oligosilylene group, or a germylene group. M is preferably titanium, zirconium, or hafnium, and especially preferably hafnium. X and Y are each preferably a halogen, and more preferably a chlorine atom.

In the component (A), specific examples of the preferred complex include dimethylsilylenebis(2-ethyl-4-phenyl-4H-azulenyl)hafnium dichloride, dimethylsilylenebis-(2-ethyl-4-(3-chloro-4-t-butylphenyl)-4H-azulenyl)hafnium dichloride, dimethylsilylenebis(2-ethyl-4-(3-fluoro-4-t-butylphenyl)-4H-azulenyl)halfnium dichloride, dimethylsilylenebis(2-ethyl-4-naphthyl-4H-azulenyl) hafnium dichloride, dimethylsilylenebis(2-ethyl-4-biphenyl-4H-azulenyl)hafnium dichloride, dimethylsilylenebis-(2-ethyl-4-(2-fluoro-4-biphenyl)-4H-azulenyl)halfinium dichloride, dimethylsilylenebis(2-ethyl-4-(4-chloro-2-naphthyl-4-azulenyl))hafnium dichloride, and dimethylsilylenebis(2-ethyl-4-(4-chloro-2-tetrahydronaphthyl-4H-tetrahydroazulenyl))hafnium dichloride.

Of these, dimethylsilylenebis(2-ethyl-4-(2-fluoro-4-biphenyl)-4H-azulenyl)hafnium dichloride, dimethylsilylenebis(2-ethyl-4-(4-chloro-2-naphthyl-4H-azulenyl))-halfnium dichloride, and dimethylsilylenebis(2-ethyl-4-(3-chloro-4-t-butylphenyl)-4H-azulenyl)hafnium dichloride are especially preferable.

<Component (B)>

In the invention, a component selected from the group consisting of the following (b-1) to (b-4) is used as the component (B).

(b-1) A finely granular support having an aluminum oxy compound supported thereon (b-2) A finely granular support having an ionic compound or Lewis acid capable of reacting with the component (A) to convert the component (A) to a cation supported thereon (b-3) A solid acid fine particle (b-4) An ion exchange layered silicate As a specific example of the aluminum oxy compound described in (b-1), aluminoxane is enumerated. As the ionic compound described in (b-2), triphenylcarboniumtetrakis-(pentafluorophenyl)borate, N,N-dimethylaniliumtetrakis-(pentafluorophenyl)borate, and N,N-dimethylanilium-tetrakis(pentafluoronaphthyl) borate can be enumerated. Also, as the Lewis acid, triphenylborane, tris(3,5-difluorophenyl)borane, tris(pentafluorophenyl)borane, and tris(heptafluoronaphthyl)borane can be enumerated. As the solid acid fine particle (b-3), magnesium chloride, alumina, and silica alumina can be enumerated.

Of these, it is desired to use the ion exchange layered silicate (b-4).

In the invention, the ion exchange layered silicate (hereinafter simply abbreviated as "silicate") that is used as the raw material means a silicate having a crystal structure where planes constituted by an ionic bond or the like are superimposed in parallel each other by means of a bonding power and ions to be contained are exchangeable. Since the majority of silicates are naturally produced mainly as the major component of clay minerals, in many cases, they contain impurities (for example, quartz and cristobalite) other than the ion exchange layered silicate, and those impurities may be contained. Specific examples of the silicate include the following stratiform silicate described in Haruo Shiromizu, *Clay Mineralogy*, Asakura Shoten (1995).

That is, the specific examples include smectite groups such as montmorillonite, sauconite, beidellite, nontronite, saponite, hectorite, and stevensite; vermiculite groups such as vermiculite; mica groups such as mica, illite, sericite, and glauconite; attapulgite; sepiolite; palygorskite; bentonite; pyrophyllite; talc; and chlorite groups.

The silicate that is used as the raw material in the invention is preferably a silicate in which the silicate as the major component has a 2:1 type structure, more preferably a smectite group, and especially preferably montmorillonite. The silicate is not particularly limited with respect to the kind of an interlayer cation but is preferably a silicate containing an alkali metal or an alkaline earth metal as the major component of an interlayer cation from the viewpoint of the matter that it is available relatively easily and inexpensively as the industrial raw material.

(Chemical treatment)

While the silicate used in the invention can be used as it is without particularly performing treatment, it is preferably subjected to chemical treatment. As the chemical treatment as referred to herein, any of surface treatment for removing impurities adhered on the surface and treatment for influencing the structure of a clay can be employed. Concretely, known acid treatment, alkali treatment, salt treatment, organic treatment, and the like disclosed in JP-A-5-301917, JP-A-7-224106, JP-A-8-127613, etc. can be employed.

Of these treatments, by employing the simultaneous treatment of lithium sulfate and sulfuric acid, it is possible to obtain a solid catalyst component advantageous for producing a polymer having a higher melting point and high activity, in which the molecular weight distribution of crystalline PP forms tail on the high molecular weight side.

<Component (C)>

The component (C) is an organoaluminum compound and is suitably a compound represented by the general formula, $AlR_p^9 pX_{3-p}$.

In the formula, R$^9$ represents a hydrocarbon group having from 1 to 20 carbon atoms; X represents a halogen, hydrogen, an alkoxy group, or an amino group; and p represents the number of larger than 0 and up to 3. The organoaluminum compound is preferably a trialkylaluminum wherein R$^9$ has from 1 to 8 carbon atoms.

(Formation of catalyst and preliminary polymerization)

The catalyst according to the invention can be formed by bringing the foregoing respective components into contact with each other in a (preliminary) polymerization vessel simultaneously or continuously, or at once or dividedly several times. As the contact method, a variety of known methods can be employed. Also, the amounts of the components (A), (B) and (C) to be used in the invention are arbitrary, and various known methods can be employed.

It is preferable that the catalyst of the invention is subjected to preliminary polymerization treatment comprising brining an olefin into contact with the catalyst to perform polymerization with a small amount. Though the olefin to be used is not particularly limited, examples thereof include ethylene, propylene, 1-butene, 1-hexene, 1-octene, 4-methyl-1-pentene, 3-methyl-1-butene, vinylcycloalkanes, and styrene. As the feed method of the olefin, arbitrary methods such as a feed method of keeping the olefin at a constant rate or under a constant pressure in a reaction vessel or a combination thereof, and a method of stepwise changing the feed can be employed. Though the temperature and time of the preliminary polymerization are not particularly limited, it is preferable that they fall within the ranges of from −20° C. to 100° C. and from 5 minutes to 24 hours, respectively. Also, with respect to the preliminary polymerization amount, the amount of the preliminarily polymerized polymer is preferably from 0.01 to 100 g, and more preferably from 0.1 to 50 g per gram of the component (B). Also, the component (C) can be added or supplemented at the time of the preliminary polymerization.

A method in which during or after the contact of the foregoing respective components, a solid such as polymers such as polyethylene and polypropylene and inorganic oxides such as silica and titania is made co-present can also be employed.

[Polymerization/production of propylene based block copolymer]

The method of producing the block copolymer of the invention is constituted of a preceding stage step of producing a propylene polymer component (PP) and a subsequent stage step of continuously producing a propylene-ethylene copolymer component (EP). In the respective steps, any polymerization methods of a bulk polymerization method and a gas phase polymerization method can be employed. However, in the subsequent stage step, because EP is a rubber component, it is desired that EP is not eluted in the solvent. Accordingly, a gas phase polymerization method is preferably employed.

Also, with respect to the polymerization process, both a batchwise method and a continuous method can be employed for the respective preceding stage step and subsequent stage step. In the invention, in general, two-stage polymerization comprising a preceding stage and a subsequent stage is carried out. According to circumstances, each stage can be further divided. In particular, a method in which the subsequent stage step is divided into two or more stages to prepare a plural kind of rubber components is one of methods of improving physical properties.

(1) Production method of propylene polymer component (PP):

PP is produced in the preceding stage polymerization step. Homopolymerization of propylene or copolymerization of propylene and an α-olefin is carried out using a metallocene catalyst, preferably a catalyst comprising the foregoing components (A) to (C). That is, this is a step of forming a propylene homopolymer or a copolymer of propylene and an α-olefin in a single stage or multiple stages so as to form the polymer in an amount corresponding to from 50 to 95% by weight, and preferably from 60 to 92% by weight of the total polymerization amount (the whole of the propylene based block copolymer). The content of the α-olefin in the polymer is less than 0.5% by weight based on the whole of the monomers (the sum of propylene and the α-olefin).

Incidentally, in the invention, the α-olefin means a concept of olefins including ethylene and excluding propylene. Though PP is preferably a homopolymer of propylene, in the case of producing a copolymer with an α-olefin, it is the most preferable that the α-olefin is ethylene.

One of the characteristic features of the block copolymer of the invention resides in the matter that PP has a high melting point as set forth in the requisite (6). For the sake of producing such high-melting PP, selection of the metallocene complex, or selection of conditions corresponding to the nature of the individual metallocene complexes such as selection of polymerization conditions under which high-melting PP can be produced, for example, polymerization temperature, polymerization pressure, and co-catalyst. The conditions to be taken vary depending upon the individual complexes, but in general, it is preferable that the polymerization pressure is high. In general, the polymerization temperature is preferably low, but it cannot be unequivocally defined because there are complexes exhibiting reverse nature. Under such circumstances, preferred conditions are enumerated as follows. That is, the polymerization temperature is from about 30 to 120° C., and preferably from about 50 to 80° C. The polymerization pressure is from 0.1 to 5 MPa, and preferably from 0.1 to 3 MPa. Also, it is preferred to use a molecular weight modifier such that the flowability (MFR) of the ultimate polymer becomes suitable, and hydrogen is preferable as the molecular weight modifier.

Also, it is necessary that the Q value and α/β of the highly crystalline polypropylene component determined by the cross fractionation method satisfy specific relations, i.e., (Q value)$\geq$2.3 and $\alpha/\beta \geq 0.4 \times$(Q value). This is achieved by polymerizing with a specific complex under a specific polymerization condition in polymerizing the PP component. As the polymerization method, though the molecular weight is controlled by the kind of a complex, the kind and amount of an organoaluminum compound, the polymerization temperature, and the amount of hydrogen, it is thought that active sites having different chain transfer characteristic to hydrogen are present in the catalyst, and it is important to employ a polymerization condition such that the difference in characteristic of the active sites can be emphasized. For example, by suppressing the chain transfer by ones other than hydrogen (for example, an organoaluminum), the chain transfer by hydrogen can mainly control the molecular weight. For achieving this, it is effective to decrease the amount of an organoaluminum compound to be used or to use an organoaluminum compound having 4 or more carbon atoms, which hardly causes chain transfer. Also, it is an effective method for obtaining a polymer satisfying the foregoing natures to use a clay mineral having been subjected to specific salt treatment (for example, salt treatment with lithium sulfate) as the co-catalyst capable of activating the metallocene catalyst. However, the invention is never limited to these measures.

(2) Production method of propylene-ethylene copolymer component (EP):

In the subsequent stage polymerization step of the invention, an ethylene-propylene copolymer having a weight ratio of propylene to ethylene to be contained of from $^{35}/_{65}$ to $^{85}/_{15}$ is formed. In this step, the polymer is formed in an amount corresponding to from 5 to 50% by weight, and preferably from 8 to 40% by weight of the total polymerization amount (the whole of the propylene based block copolymer). In this step, electron donating compounds such as active hydrogen-containing compounds or nitrogen-containing compounds and oxygen-containing compounds may be present.

The thus obtained propylene based block copolymer of the invention can be provided for molding materials as pellets by compounding with a variety of additives such as antioxidants, ultraviolet absorbers, antistatic agents, nucleating agents, lubricants, flame retardants, anti-blocking agents, colorants, and inorganic or organic fillers and further with various synthetic resins, as the need arises, melt kneading upon heating using a melt kneader, and then cutting in the granular form.

The molding material in the pellet form is molded by various known molding techniques of polypropylene such as injection molding, extrusion molding, foam molding, and blow molding, whereby a variety of molded articles such as various industrial injection molded parts, various containers, non-stretched films, uniaxially stretched films, biaxially stretched films, sheets, pipes, and fibers can be produced.

With respect to physical properties of molded articles, products having a flexural modulus of 920 MPa or more, and preferably 940 MPa or more and a Heat deflection temperature of 109° C. or higher, and preferably 110° C. or higher can be easily produced.

EXAMPLES

The invention will be more specifically described with reference to the following Examples, but it should be construed that the invention is never limited to these Examples so far as they do not fall outside the gist of the invention.

Incidentally, the following catalyst synthesis step and polymerization step were all carried out in a purified nitrogen atmosphere. Also, the solvent to be used was one resulting from dehydration with a molecular sieve, MS-4A. The measurement methods and devices of respective physical properties in the invention are shown below.

(1) MFR:
Device: Takara's melt indexer
Measurement method: The measurement was carried out according to JIS-K7210 (230° C., load: 2.16 kg).

(2) Propylene content of portion insoluble in ODCB at 100° C.:
The propylene content was determined from an infrared absorption spectrum of the portion insoluble in ODCB at 100° C. as recovered according to the foregoing method.

(3) Ethylene content (G) of EP and EP content in the whole of propylene based block copolymer:
The measurement was carried out according to the foregoing method.

(4) Q value and $\alpha/\beta$ of highly crystalline polypropylene component:
The measurement was carried out according to the foregoing method.

(5) Melting point:
A sample was heated from room temperature up to 230° C. under a condition of 80° C./min using a DSC7 model differential scanning calorimeter manufactured by Perkin Elmer, Inc. After keeping at that temperature for 10 minutes, the sample was cooled to 50° C. at a rate of −10° C./min and then kept at that temperature for 3 minutes. Then, a peak temperature at which the sample melted under a heating condition of 10° C./min was defined as a melting point.

(6) Flexural modulus (FM) (unit: MPa):
The measurement was carried out at 23° C. according to JIS-K7203.
The dimensions of the molded article to be used were 90×10×4 mm.

(7) Izod impact strength (unit: $kJ/m^2$):
The measurement was carried out at −30° C. according to JIS-K7110.

(8) Heat deflection temperature (unit: ° C.):
The measurement was carried out under a condition of 4.6 $kgf/cm^2$ according to JIS-K7207. However, as the preparation of a specimen prior to the measurement, operations of annealing a molded article at 100° C. for 30 minutes and then cooling to room temperature are carried out.

(9) Flow mark:
The pellets were blended with 2 parts of a block pigment master batch, and the blend was molded into a sheet having the shape of 350 mm×100 mm×2 mm at a molding temperature of 220° C. using an injection molding machine with a clamping force of 170 tons. Then, a generation distance of a flow mark was measured and judged.

Judgment criteria:
○: The generation distance exceeds 250 mm.
Δ: The generation distance exceeds 150 mm and is not more than 250 mm.
×: The generation distance is not more than 150 mm.

Example 1
[Synthesis of complex]
(1) synthesis of dichloro{1,1'-dimethylsilylenebis[2-ethyl-4-(2-fluoro-4-biphenyl)-4H-azulenyl]}hafnium:
(a) Synthesis of racemic/meso mixture:
2-Fluoro-4-bromobiphenyl (4.63 g, 18.5 mmol) was dissolved in a mixed solvent of diethyl ether (40 mL) and hexane (40 mL), to which was then added dropwise a pentane solution of t-butyllithium (22.8 mL, 36.9 mmol, 1.62 N) at −78 ° C., and the mixture was stirred at −5° C. for 2 hours. 2-Ethylazulene (2.36 g, 16.6 mmol) was added to the resulting solution, and the mixture was stirred at room temperature for 1.5 hours. After cooling to 0° C., tetrahydrofuran (40 mL) was added thereto. N-Methylimidazole (40 μL) and dimethyldichlorosilane (1.0 mL, 8.30 mmol) were further added, the temperature was raised to room temperature, and the mixture was then stirred at room temperature for one hour. Thereafter, dilute hydrochloric acid was added to the reaction mixture, and after liquid separation, an organic phase was dried over magnesium sulfate, and the solvent was evaporated off in vacuo, to obtain a crude product (6.3 g) of dimethylsilylenebis(2-ethyl-4-(2-fluoro-4-biphenylyl)-1,4-dihydroazulene).

Next, the resulting crude product was dissolved in diethyl ether (23 mL), to which was then added dropwise a hexane solution of n-butyllithium (10.3 mL. 16.6 mmol, 1.56 mol/L) at −78° C., and after raising the temperature step by step, the mixture was stirred at room temperature for 2 hours. Toluene (185 mL) was further added thereto, the mixture was cooled to −78° C., and hafnium tetrachloride (2.65 g, 8.3 mmol) was added. After raising the temperature step by step, the mixture was stirred at room temperature overnight. The majority of the solvent was evaporated off in vacuo from the resulting slurry solution, and after filtration, the residue was washed with toluene (4 mL), hexane (9 mL), ethanol (20 mL), and hexane (10 mL) to obtain a racemic/meso mixture (1.22 mg, yield: 16%) of dichloro{1,1'-dimethylsilylenebis[2-ethyl-4-(2-fluoro-4-biphenylyl)-4H-azulenyl]}hafnium.

(b) Purification to obtain racemate:
The resulting crude product (1.1 g) of the racemic/meso mixture was suspended in dichloromethane (30 mL) and irradiated with light for 30 minutes using a high pressure mercury vapor lamp (100 W). The solvent was evaporated off in vacuo from this solution. The resulting solid was suspended by addition of dichloromethane (40 mL), followed by filtration. The residue was washed with hexane (3 mL) and dried in vacuo to obtain a purified product (577 mg, 52%) of the racemate.

$^1$H-NMR (300 MHz, $CDCl_3$): δ1.02 (s, 6H, $SiMe_2$), 1.08 (t, J=8 Hz, 6H, $CH_3CH_2$), 2.54 (sept, J=8 Hz, 2H, $CH_3CH_2$), 2.70 (sept, J=8 Hz, 2H, $CH_3CH_2$), 5.07 (brs, 2H, 4-H), 5.85 to 6.10 (m, 8H), 6.83 (d, J=12 Hz, 2H), 7.30 to 7.6 (m, 16H, arom).

[Chemical treatment of ion exchange layered silicate]
In a 5-liter separable flask equipped with an agitator and a reflux unit, 500 g of ion-exchanged water is charged, 611 g (5.93 mol) of lithium sulfate is then charged, and the mixture is stirred.

Separately, 581 g (5.93 mol) of sulfuric acid is diluted with 500 g of ion-exchanged water, and the foregoing lithium sulfate aqueous solution is then added dropwise thereto using a dropping funnel, followed by mixing.

Next, 350 g of commercially available granulated montmorillonite (Benclay SL, manufactured by Mizusawa Industrial Chemicals, Ltd., mean particle size: 28.0 μm) is added, followed by stirring. Thereafter, the temperature is raised to 108° C. over 30 minutes, and the temperature is kept for 150 minutes. Thereafter, the resulting mixture is cooled to 50° C. over one hour. This slurry was subjected to filtration in vacuo using a nutsche filter and a device having an aspirator and a suction bottle connected thereto. A cake was recovered, to which was then added 5.0 L of pure water to form a slurry again, followed by filtration. This operation was further repeated five times. In any case, the filtration was completed within several minutes. An ultimate washing (filtrate) had a pH of 5.

The recovered cake was dried at 110° C. through the night in a nitrogen atmosphere. As a result, 290 g of a chemically treated material was obtained. As a result of analysis of the formulation by fluorescent X-rays, molar ratios of the constitutional elements against silicon as the major component were Al/Si=0.18, Mg/Si=0.042, and Fe/Si=0.020, respectively.

[Preparation of catalyst/preliminary polymerization]

The following operation was carried out under an inert gas using deoxidized and dehydrated solvent and monomer. The previously produced chemically treated ion exchange layered silicate granules were dried in vacuo at 200° C. for 4 hours.

In an autoclave having an inner volume of 10 L, 200 g of the above-obtained chemically treated montmorillonite was introduced, 1,160 mL of heptane and 840 mL (0.5 mol) of a heptane solution of triethylaluminum (0.6 mmol/mL) were charged over 30 minutes, and the mixture was stirred at 25° C. for one hour. Thereafter, the slurry was subjected to stationary sedimentation, and 1,300 mL of a supernatant was discharged, washed twice with 2,500 mL of heptane, and then adjusted while supplementing heptane such that the whole amount of heptane ultimately became 1,200 mL.

Next, 5.93 g (6 mol) of dimethylsilylenebis(2-ethyl-4-(2-fluoro-4-biphenyl)-4H-azulenyl)hafnium dichloride and 516 mL of heptane were charged in a 2-liter flask, and after well stirring, 84 mL (11.8 g) of a heptane solution of triisobutylaluminum (140 mg/mL) was added thereto at room temperature, followed by stirring for 60 minutes.

Subsequently, the resulting solution was introduced into the montmorillonite previously prepared in the autoclave, and the mixture was stirred for 60 minutes. Further, heptane was introduced until the whole volume became 5 L, and the mixture was kept at 30° C.

Propylene was introduced thereinto at a constant rate of 100 g/hr at 40° C. for 4 hours, and subsequently, the mixture was kept at 50° C. for 2 hours. A preliminarily polymerized catalyst slurry was recovered by a siphon, and after removing a supernatant, the residue was dried in vacuo at 40° C. According to this operation, a preliminarily polymerized catalyst containing 1.7 g of polypropylene per gram of the solid catalyst was obtained.

[Polymerization/production of propylene based block co-polymer]

In a well dried 3-liter autoclave equipped with an agitator, 200 mg of triisobutylaluminum, 140 NmL of hydrogen, and 750 g of propylene were introduced, the temperature in the polymerization vessel was kept at 65° C., and the above-obtained preliminarily polymerized catalyst was introduced under pressure in an amount of 55 mg reduced as the solid catalyst component, thereby initiating bulk polymerization of propylene (preceding stage polymerization). The temperature was kept at 65° C. during the polymerization, and hydrogen was continuously introduced at a rate of 220 NmL/hr such that the hydrogen concentration of the gas phase portion in the polymerization system was kept constant.

After a lapse of one hour, the unreacted monomer was purged and then displaced with a nitrogen gas. Subsequently, a mixed gas of propylene and ethylene was introduced such that the molar fraction of ethylene became 60% by mole and that the whole pressure of the polymerization vessel became 1.8 MPa, thereby initiating gas phase polymerization of a propylene-ethylene copolymer component (EP) (subsequent stage polymerization). By introducing a propylene/ethylene mixed gas having a composition of 35% by mole of ethylene so as to have the same composition of ethylene in formed EP, the mixed gas composition in the polymerization vessel was kept at 60% by mole in terms of molar fraction of ethylene during the polymerization. Also, the temperature in the vessel was kept at 65° C. during the polymerization, and the mixed gas was introduced so as to keep the whole pressure at 1.8 MPa. After a lapse of 45 minutes, the unreacted monomer was purged, and the autoclave was opened to recover a reacted polymer.

The resulting powdered propylene based block copolymer was compounded with 0.10% by weight of IRGANOX 1010 (manufactured Ciba Speciality Chemicals), 0.10% by weight of IRGAFOS 168 (manufactured by Ciba Speciality Chemicals), and 0.05% by weight of calcium stearate as compounding components, and the mixture was kneaded and granulated by a uniaxial extruder to obtain a propylene based block copolymer in the pellet form.

The resulting block copolymer pellets were introduced into a heated injection molding machine at a mold temperature of 40° C. and a cylinder temperature of 220° C., to form a specimen by injection molding. The resulting injection molded specimen was measured with respect to flexural modulus, Izod impact strength and Heat deflection temperature by the foregoing methods. Further, the generation distance of a flow mark was measured according to the foregoing method.

Powders obtained in the following Examples were treated in the same manners and measured with respect to physical properties in the same manners.

Example 2

Polymerization was carried out in the same manner as in Example 1, except that in the subsequent stage polymerization for producing EP of Example 1, the composition of the mixed gas to be introduced at the time of initiation of the polymerization was set up at 75% by mole of ethylene and that a mixed gas containing 55% by mole of ethylene was introduced during the polymerization.

Comparative Example 1

(1) Synthesis of complex:

(r)-Dimethylsilylenebis(2-methyl-4-phenylindenyl)-zirconium dichloride was synthesized according to the method described in a literature, *Organometallics*, 13, 964, 1994.

(2) Synthesis of catalyst:

In a glass-made reactor equipped with an agitator having an inner volume of 0.5 L, 2.4 g (20.7 mmol-Al) of MAO ON $SiO_2$ manufactured by WITCO was introduced, and 20.0 mL (0.0637 mmol) of an (r)-dimethylsilylenebis(2-methyl-4-phenylindenyl) zirconium dichloride solution previously diluted with toluene was added. Subsequently, 4.14 mL (3.03 mmol) of a solution of triisobutylaluminum (TIBA) in n-heptane was added. The mixture was allowed to react at room temperature for 2 hours, and propylene was then flown to perform preliminary polymerization. According to this operation, a preliminarily polymerized catalyst containing 1.3 g of polypropylene per gram of the catalyst was obtained.

[Polymerization]

In a well dried 3-liter autoclave equipped with an agitator, 200 mg of triisobutylaluminum, 100 NmL of hydrogen, and 750 g of propylene were introduced, the temperature in the polymerization vessel was kept at 65° C., and the catalyst obtained above was introduced under pressure in an amount of 100 mg reduced as the solid catalyst component, thereby initiating bulk polymerization of propylene. The temperature was kept at 65° C. during the polymerization, and hydrogen was continuously introduced at a rate of 100 NmL/hr such that the hydrogen concentration of the gas phase portion in the polymerization system was kept constant.

After a lapse of one hour, the unreacted monomer was purged and then displaced with a nitrogen gas.

Subsequently, in the EP polymerization, by setting up the composition of a mixed gas to be introduced at the time of initiation of the polymerization at 55% by mole of ethylene and introducing a mixed gas containing 45% by mole of ethylene during the polymerization, the composition of the mixed gas in the polymerization vessel was kept at 55% by mole in terms of molar fraction of ethylene. Also, the temperature in the vessel was kept at 65° C. during the polymerization, and a mixed gas was introduced so as to keep the whole pressure at 1.8 MPa.

After a lapse of 30 minutes, the unreacted monomer was purged, and the autoclave was opened to recover a reacted polymer.

Comparative Example 2

In a well dried 3-liter autoclave equipped with an agitator, 200 mg of triisobutylaluminum, 140 NmL of hydrogen, 750 g of propylene, and 5 g of ethylene were introduced, the temperature in the polymerization vessel was kept at 65° C., and the preliminarily polymerized polymerization catalyst obtained in Example 1 was introduced under pressure in an amount of 50 mg reduced as the solid catalyst component, thereby initiating bulk polymerization of propylene (preceding stage polymerization). The temperature was kept at 65° C. during the polymerization, and hydrogen was continuously introduced at a rate of 220 NmL/hr such that the hydrogen concentration of the gas phase portion in the polymerization system was kept constant.

After a lapse of one hour, the unreacted monomer was purged and then displaced with a nitrogen gas. Subsequently, a mixed gas of propylene and ethylene was introduced such that the molar fraction of ethylene became 65% by mole and that the whole pressure of the polymerization vessel became 1.8 MPa, thereby initiating gas phase polymerization of a propylene-ethylene copolymer component (EP) (subsequent stage polymerization). By introducing a propylene/ethylene mixed gas having a composition of 40% by mole of ethylene so as to have the same composition of ethylene in formed EP, the mixed gas composition in the polymerization vessel was kept at 65% by mole in terms of molar fraction of ethylene during the polymerization. Also, the temperature in the vessel was kept at 65° C. during the polymerization, and the mixed gas was introduced so as to keep the whole pressure at 1.8 MPa. After a lapse of 50 minutes, the unreacted monomer was purged, and the autoclave was opened to recover a reacted polymer.

Example 3

In a well dried 3-liter autoclave equipped with an agitator, 200 mg of triisobutylaluminum, 90 NmL of hydrogen, and 750 g of propylene were introduced, the temperature in the polymerization vessel was kept at 65° C., and the preliminarily polymerized polymerization catalyst used in Example 1 was introduced under pressure in an amount of 55 mg reduced as the solid catalyst component, thereby initiating bulk polymerization of propylene. The temperature was kept at 65° C. during the polymerization, and hydrogen was continuously introduced at a rate of 100 NmL/hr such that the hydrogen concentration of the gas phase portion in the polymerization system was kept constant.

After a lapse of one hour, the unreacted monomer was purged and then displaced with a nitrogen gas. Subsequently, a mixed gas of propylene and ethylene was introduced such that the molar fraction of ethylene became 65% by mole and that the whole pressure of the polymerization vessel became 1.8 MPa, thereby initiating gas phase polymerization of EP. By introducing a mixed gas having a composition of 45% by mole of ethylene so as to have the same composition of ethylene in formed EP, the mixed gas composition in the polymerization vessel was kept at 65% by mole in terms of molar fraction of ethylene during the polymerization. Also, the temperature in the vessel was kept at 65° C. during the polymerization, and the mixed gas was introduced so as to keep the whole pressure at 1.8 MPa.

After a lapse of 20 minutes, the unreacted monomer was purged, and the autoclave was opened to recover a reacted polymer.

Comparative Example 3

In a well dried 3-liter autoclave equipped with an agitator, 200 mg of triisobutylaluminum and 750 g of propylene were introduced, the temperature in the polymerization vessel was kept at 65° C., and the preliminarily polymerized catalyst used in Comparative Example 1 was introduced under pressure in an amount of 100 mg reduced as the solid catalyst component, thereby initiating bulk polymerization of propylene. The temperature was kept at 65° C. during the polymerization.

After a lapse of one hour, the unreacted monomer was purged and then displaced with a nitrogen gas.

Subsequently, in the EP polymerization, by setting up the composition of a mixed gas to be introduced at the time of initiation of the polymerization at 55% by mole of ethylene and introducing a mixed gas containing 45% by mole of ethylene during the polymerization, the composition of the mixed gas in the polymerization vessel was kept at 55% by mole in terms of molar fraction of ethylene. Also, the temperature in the vessel was kept at 65° C. during the polymerization, and a mixed gas was introduced so as to keep the whole pressure at 1.8 MPa.

After a lapse of 20 minutes, the unreacted monomer was purged, and the autoclave was opened to recover a reacted polymer.

Example 4

In a well dried 3-liter autoclave equipped with an agitator, 200 mg of triisobutylaluminum, 300 NmL of hydrogen, and 750 g of propylene were introduced, the temperature in the polymerization vessel was kept at 65° C., and the preliminarily polymerized catalyst used in Example 1 was introduced under pressure in an amount of 55 mg reduced as the solid catalyst component, thereby initiating bulk polymerization of propylene. The temperature was kept at 65° C. during the polymerization, and hydrogen was continuously introduced at a rate of 300 NmL/hr such that the hydrogen concentration of the gas phase portion in the polymerization system was kept constant.

After a lapse of one hour, the unreacted monomer was purged and then displaced with a nitrogen gas.

Subsequently, a mixed gas of propylene and ethylene was introduced such that the molar fraction of ethylene became 55% by mole and that the whole pressure of the polymerization vessel became 1.8 MPa, thereby initiating gas phase polymerization of EP. By introducing a mixed gas having a composition of 30% by mole of ethylene so as to have the same composition of ethylene in formed EP, the mixed gas composition in the polymerization vessel was kept at 55% by mole in terms of molar fraction of ethylene during the polymerization. Also, the temperature in the vessel was kept at 65° C. during the polymerization, and the mixed gas was introduced so as to keep the whole pressure at 1.8 MPa.

After a lapse of 60 minutes, the unreacted monomer was purged, and the autoclave was opened to recover a reacted polymer.

Comparative Example 4

In a well dried 3-liter autoclave equipped with an agitator, 200 mg of triisobutylaluminum, 200 NmL of hydrogen, and 750 g of propylene were introduced, the temperature in the polymerization vessel was kept at 65° C., and the preliminarily polymerized catalyst used in Comparative Example 1 was introduced under pressure in an amount of 100 mg reduced as the solid catalyst component, thereby initiating bulk polymerization of propylene. The temperature was kept at 65° C. during the polymerization, and hydrogen was continuously introduced at a rate of 150 NmL/hr such that the hydrogen concentration in the polymerization system was kept constant.

After a lapse of one hour, the unreacted monomer was purged and then displaced with a nitrogen gas.

Subsequently, in the EP polymerization, by setting up the composition of a mixed gas to be introduced at the time of initiation of the polymerization at 40% by mole of ethylene and introducing a mixed gas containing 30% by mole of ethylene during the polymerization, the composition of the mixed gas in the polymerization vessel was kept at 40% by mole in terms of molar fraction of ethylene. Also, the temperature in the vessel was kept at 65° C. during the polymerization, and a mixed gas was introduced so as to keep the whole pressure at 1.8 MPa.

After a lapse of 60 minutes, the unreacted monomer was purged, and the autoclave was opened to recover a reacted polymer.

Example 5

Figure 4:
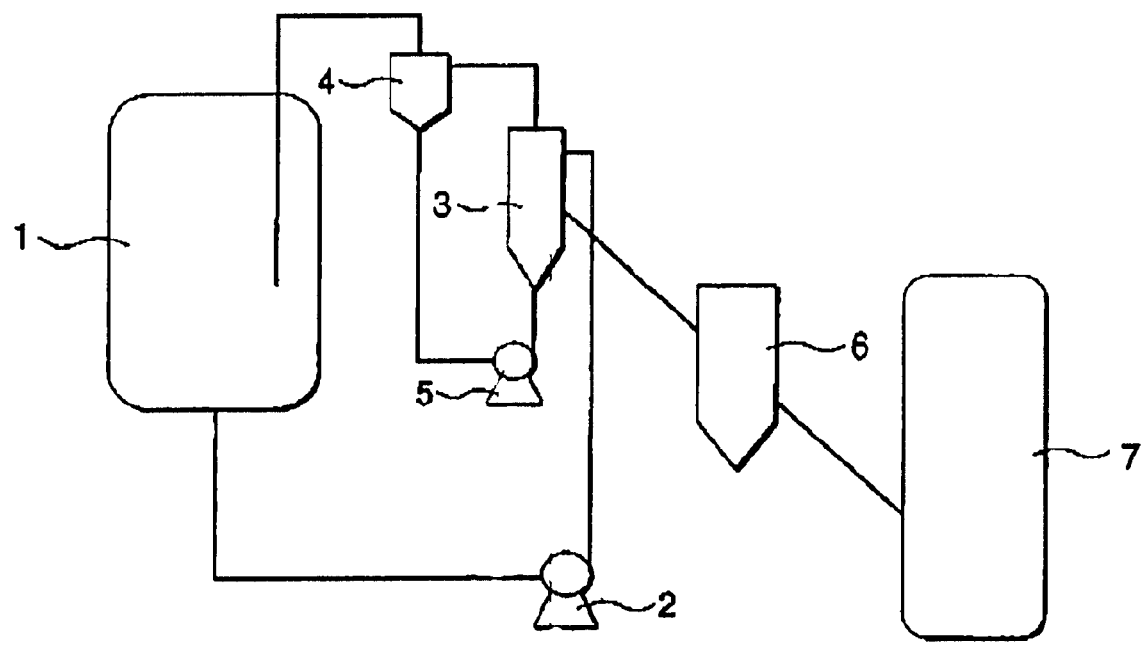
FIG. 4 is a production process flow diagram of the continuous two-stage polymerization method.

As shown in FIG. 4, continuous production of a propylene-ethylene block copolymer was carried out by a process into which a classification system constituted of a sedimentation liquid force classifier 3, a condenser 4 (liquid cyclone) and a counter-flow pump 5 and a degasification vessel 6 were incorporated between a liquid phase polymerization vessel 1 equipped with an agitation unit having an inner volume of 0.4 m$^3$ and an agitation type gas phase polymerization vessel 7 of 0.5 m$^3$.

Liquid propylene, hydrogen and triisobutylaluminum (TIBA) were continuously fed into the liquid phase polymerization vessel 1. Incidentally, the feed amounts of liquid propylene and TIBA were 90 kg/hr and 10.6 g/hr, respectively, and hydrogen was fed such that the molar concentration [H$_2$] was 270 ppm.

Further, the same preliminarily polymerized catalyst used in Example 1 was fed in an amount of 2.21 g/hr reduced as the solid catalyst component. Also, the polymerization vessel 1 was cooled such that the polymerization temperature became 65° C.

A slurry polymerized in this polymerization vessel 1 was discharged into the degasification vessel 6 at a rate of about 17.5 kg/hr as polypropylene particles contained in the slurry through the classification system. An average residence time of the polypropylene particles in the liquid phase polymerization vessel 1 and the circulation line was 1.25 hours.

Also, the polypropylene particles had a mean particle size Dp$_{50}$ of 555 μm, an average CE of 7600 g/g, and an MFR of 55.0 g/10 min. Incidentally, the catalytic efficiency CE is defined in terms of a propylene yield (g) per gram of the solid component contained in the solid catalyst component (A). In the degasification vessel 6, the temperature in the vessel was kept at 65° C. while feeding a heated propylene gas from the lower portion. The thus obtained solid polypropylene particles were transferred to the gas phase polymerization vessel 7, thereby performing copolymerization (EPR polymerization) of propylene and ethylene. The polymerization was carried out while controlling such that the sum of partial pressures of ethylene and propylene was 1.4 MPaG, the molar fraction of ethylene was 60% by mole, and the hydrogen concentration was constant at 30 ppm. Further, ethanol was fed as an active hydrogen compound. The feed amount of ethanol was set up at a molar ratio of 0.45 against aluminum in TIBA to be fed as entrained with the polymer particles fed to the gas phase polymerization vessel 7. The polymerization temperature was 65° C., and the discharge rate of the propylene-ethylene block copolymer discharged from the gas phase polymerization vessel 7 was adjusted at about 20 kg/hr. An average residence time in the gas phase polymerization vessel 7 was 1.5 hr.

The polymerization particles discharged from the gas phase polymerization vessel 7 were analyzed. As a result, the MFR was 32.0 g/10 min, the bulk density (BD) was 0.486 g/cc, and the EP content was 15.9% by weight, respectively. Incidentally, the propylene-ethylene block copolymer had an average CE of 8,600 g/g.

The propylene based block copolymer was compounded with compounding components in compounding proportions (% by weight) of 0.10% by weight of IRGANOX 1010 (manufactured Ciba Speciality Chemicals), 0.10% by weight of IRGAFOS 168 (manufactured by Ciba Speciality Chemicals), and 0.05% by weight of calcium stearate, and the mixture was kneaded and granulated by a uniaxial extruder to obtain a resin block copolymer in the pellet form.

The resulting block copolymer pellets were introduced into a heated injection molding machine at a mold temperature of 40° C. and a cylinder temperature of 220° C., to form a specimen by injection molding. The resulting injection molded specimen was measured with respect to flexural modulus, Izod impact strength and Heat deflection temperature by the foregoing methods. Further, the generation distance of a flow mark was measured according to the foregoing method.

Example 6

In Example 5, feeding was carried out such that the molar fraction of ethylene in the gas phase polymerization vessel 7 was constant at 70% by mole, and the feed amount of ethanol as the active hydrogen compound was set up at a molar ratio of 0.10 against aluminum in TIBA to be fed as entrained with the polymer particles fed to the gas phase polymerization vessel 7. The discharge rate of the propylene-ethylene block copolymer discharged from the gas phase polymerization vessel 7 was adjusted at about 20 kg/hr. An average residence time in the gas phase polymerization vessel 7 was 2.3 hr.

The polymerization particles discharged from the gas phase polymerization vessel 7 were analyzed. As a result, the MFR was 25.0 g/10 min, the bulk density (BD) was 0.483 g/cc, and the EP content was 17.5% by weight, respectively. Incidentally, the propylene-ethylene block copolymer had an average CE of 9,500 g/g.

Example 7

In a well dried 3-liter autoclave equipped with an agitator, 200 mg of triisobutylaluminum, 150 NmL of hydrogen, and 750 g of propylene were introduced, the temperature in the polymerization vessel was kept at 65° C., and the catalyst used in Example 1 was introduced under pressure in an amount of 55 mg reduced as the solid catalyst component, thereby initiating bulk polymerization of propylene. The temperature was kept at 65° C. during the polymerization, and hydrogen was continuously introduced at a rate of 250 NmL/hr such that the hydrogen concentration of the gas phase portion in the polymerization system was kept constant.

After a lapse of one hour, the unreacted monomer was purged and then displaced with a nitrogen gas.

Subsequently, a mixed gas of propylene and ethylene was introduced such that the molar fraction of ethylene became 85% by mole and that the whole pressure of the polymerization vessel became 1.8 MPa, thereby initiating gas phase polymerization of EP. By introducing a mixed gas having a composition of 80% by mole of ethylene so as to have the same composition of ethylene in formed EP, the mixed gas composition in the polymerization vessel was kept at 85% by mole in terms of molar fraction of ethylene during the polymerization. Also, the temperature in the vessel was kept at 65° C. during the polymerization, and the mixed gas was introduced so as to keep the whole pressure at 1.8 MPa.

After a lapse of 45 minutes, the unreacted monomer was purged, and the autoclave was opened to recover a reacted polymer.

Comparative Example 5

In a well dried 3-liter autoclave equipped with an agitator, 200 mg of triisobutylaluminum, 100 NmL of hydrogen, and 750 g of propylene were introduced, the temperature in the polymerization vessel was kept at 65° C., and the catalyst used in Comparative Example 1 was introduced under pressure in an amount of 100 mg reduced as the solid catalyst component, thereby initiating bulk polymerization of propylene. The temperature was kept at 65° C. during the polymerization, and hydrogen was continuously introduced at a rate of 100 NmL/hr such that the hydrogen concentration in the polymerization system was kept constant.

After a lapse of one hour, the unreacted monomer was purged and then displaced with a nitrogen gas.

Subsequently, in the EP polymerization, by setting up the composition of a mixed gas to be introduced at the time of initiation of the polymerization at 80% by mole of ethylene and introducing a mixed gas containing 70% by mole of ethylene during the polymerization, the composition of the mixed gas in the polymerization vessel was kept at 80% by mole in terms of molar fraction of ethylene. Also, the temperature in the vessel was kept at 65° C. during the polymerization, and a mixed gas was introduced so as to keep the whole pressure at 1.8 MPa.

After a lapse of 45 minutes, the unreacted monomer was purged, and the autoclave was opened to recover a reacted polymer.

Comparative Example 6

In a 3-liter round bottom four-necked flask equipped with a vacuum stirrer and a thermometer, 2.0 mol of $Mg(OEt)_2$ was charged, $Ti(OBu)_4$ was then introduced in such an amount that $Ti(OBu)_4/Mg$ was 0.6 (molar ratio) against magnesium in charged $Mg(OEt)_2$, and the temperature was raised while stirring at 200 rpm.

After reacting at 150° C. for 2.0 hours, the temperature was dropped to 120° C., and a toluene solution of $Si(OPh)_4$ was added in such an amount that $Si(OPh)_4/Mg$ was 0.5 (molar ratio) against magnesium in charged $Mg(OEt)_2$. After completion of the addition, the mixture was allowed to react at that temperature for 1.0 hour. After completion of the reaction, the temperature was dropped to room temperature, and $Si(OEt)_4$ was then added in such an amount that $Si(OEt)_4/Mg$ was 0.2 (molar ratio) against magnesium in charged $Mg(OEt)_2$, to obtain a slurry of Ti/Mg catalytic product.

The whole of the resulting slurry was transferred to an induction stirring type 10-linter autoclave equipped with a jacket for cooling and heating and then diluted with toluene in an amount of [Mg]=0.486 mol/L-toluene. The slurry was cooled to −10° C. while stirring at 300 rpm, to which was then added diethyl phthalate in such an amount that diethyl phthalate/Mg was 0.1 (molar ratio) against magnesium in charged Mg (OEt)$_2$. Subsequently, $TiCl_4$ was added dropwise over 1.0 hour in such an amount that $TiCl_4/Mg$ was 4.0 (molar ratio) against magnesium in charged $Mg(OEt)_2$, to obtain a uniform solution. At this time, a phenomenon wherein the viscosity of a liquid increases to form a gel did not occur.

The resulting uniform solution was subjected to temperature rising to 15° C. at 0.5° C./min and then kept at that temperature for one hour. Next, the temperature was again raised to 50° C. at 5° C./min, and the solution was kept at 50° C. for one hour. Further, the temperature was raised to 117° C. at 1.0° C./min, and the solution was treated at that temperature for one hour. After completion of the treatment, heating and stirring were stopped, a supernatant was removed, and the residue was washed with toluene such that the liquid residence rate was $\frac{1}{50}$, to obtain a solid slurry.

Next, the amount of toluene of the resulting solid slurry was adjusted such that the $TiCl_4$ concentration was 2.0 mol/L-toluene, and $TiCl_4$ was added at room temperature in such an amount that $TiCl_4/Mg$ was 5.0 (molar ratio) against magnesium in initially charged $Mg(OEt)_2$. This slurry was subjected to temperature rising while stirring at 300 rpm and allowed to react at 117° C. for one hour.

After completion of the reaction, heating and stirring were stopped, a supernatant was removed, and the residue was washed with toluene such that the liquid residence rate was $\frac{1}{50}$, to obtain a toluene slurry of Ti/Mg catalytic product. The whole of the resulting solid slurry was transferred to a reaction vessel having an inner diameter of 660 mm and a constricted part of 770 mm and equipped with a three-way sweptback blade and diluted with n-hexane such that the concentration of the Ti—Mg catalytic product was 3 g/L. Tiethylaluminum was added at 25° C. to this slurry while stirring at 300 rpm in such an amount that triethylaluminum/Ti—Mg catalytic product was 3.44 mmol/g, and t-butylethyldimethoxysilane was further added in such an amount that t-butylethyldimethoxysilane/Ti—Mg catalytic product was 1.44 mmol/g. After completion of the addition, the mixture was kept at 25° C. for 30 minutes while continuously stirring.

Next, a propylene gas was fed at a fixed rate over 72 minutes to the liquid phase. After stopping feeding of the propylene gas, the resulting solid was washed with n-hexane by the sedimentation washing method to obtain a slurry of the solid catalyst component (A) at a liquid residence rate of 1/12. The resulting preliminarily polymerized catalyst contained a propylene polymer in an amount of 2.7 g per gram of the Ti—Mg catalytic product.

In a well dried 3-liter autoclave equipped with an agitator, 550 mg of triethylaluminum, 3,000 NmL of hydrogen, and 750 g of propylene were introduced, the temperature in the polymerization vessel was kept at 70° C., and the above-obtained catalyst was introduced under pressure in an amount of 10 mg reduced as the solid catalyst component, thereby initiating bulk polymerization of propylene. The temperature was kept at 70° C. during the polymerization. After a lapse of one hour, the unreacted monomer was purged and then displaced with a nitrogen gas. Subsequently, a mixed gas of propylene and ethylene was introduced such that the molar fraction of ethylene became 40% by mole and that the whole pressure of the polymerization vessel became 1.8 MPa, thereby initiating gas phase polymerization of EP. The temperature in the vessel was kept at 75° C., and ethylene and propylene were introduced so as to keep the composition of the mixed gas in the polymerization vessel at 40% by mole in terms of a molar fraction of ethylene. After a lapse of 45 minutes, the unreacted monomer was purged, and the autoclave was opened to recover a reacted polymer.

Example 8

[synthesis of complex]
Synthesis of dichloro{1,1'-dimethylsilylenebis[2-ethyl-4-(3-chloro-4-tert-butylphenyl)-4H-azulenyl]}hafnium:

(a) Synthesis of racemic/meso mixture:
3-Chloro-4-tert-butylromobenzene (4.58 g, 18.5 mmol) was dissolved in a mixed solvent of diethyl ether (40 mL) and hexane (40 mL), to which was then added dropwise a pentane solution of t-butyllithium (22.8 mL, 36.9 mmol, 1.62 N) at −78° C., and the mixture was stirred at −5° C. for 2 hours. 2-Ethylazulene (2.36 g, 16.6 mmol) was added to the resulting solution, and the mixture was stirred at room temperature for 1.5 hours. After cooling to 0° C., tetrahydrofuran (40 mL) was added thereto. N-Methylimidazole (40 μL) and dimethyldichlorosilane (1.0 L, 8.30 mmol) were further added, the temperature was raised to room temperature, and the mixture was then stirred at room temperature for one hour. Thereafter, dilute hydrochloric acid was added, and after phase separation, an organic phase was dried over magnesium sulfate, and the solvent was evaporated off in vacuo, to obtain a crude product (6.1 g) of dimethylsilylenebis(2-ethyl-4-(3-chloro-4-tert-butylphenyl)-1,4-dihydroazulene).

Next, the resulting crude product was dissolved in diethyl ether (23 mL), to which was then added dropwise a hexane solution of n-butyllithium (10.3 mL. 16.6 mmol, 1.56 mol/L) at −78° C., and after raising the temperature step by step, the mixture was stirred at room temperature for 2 hours. Toluene (185 mL) was further added thereto, the mixture was cooled to −78° C., and hafnium tetrachloride (2.65 g, 8.3 mmol) was added. After raising the temperature step by step, the mixture was stirred at room temperature overnight. The majority of the solvent was evaporated off in vacuo from the resulting slurry solution, and after filtration, the residue was washed with toluene (4 mL), hexane (9 mL), ethanol (20 mL), and hexane (10 mL) to obtain a racemic/meso mixture (1.70 mg, yield: 20%) of dichloro{1,1'-dimethylsilylenebis[2-ethyl-4-(3-chloro-4-tert-butylphenyl)-4H-azulenyl]}hafnium.

(b) Purification to obtain racemate:
1.5 g of the resulting mixture was dissolved in 75 mL of dichloromethane and irradiated with light for 30 minutes using a high pressure mercury vapor lamp (100 W). The solvent was evaporated off in vacuo from this solution, and the residue was repeatedly washed with hexane. The resulting residue was further washed with diethyl ether and dried in vacuo to obtain 0.27 g of a racemate of dichloro{1,1'-dimethylsilylene-bis[2-ethyl-4-(4-tert-butyl-3-chlorophenylyl)-4H-azulenyl]}hafnium.

$^1$H-NMR (CDCl$_3$): δ1.00 (s, 6H, SiMe$_2$), 1.05 (t, J=5.6 Hz, 6H, 2-CH$_2$CH$_3$), 1.47 (s, 18H, tBu), 2.4 to 2.5 (m, 2H, 2-CH$_2$CH$_3$), 2.6 to 2.7 (m, 2H, 2-CH$_2$CH$_3$), 4.99 (d, J=3.0 Hz, 2H, 4-H), 5.8 to 6.1 (m, 6H), 6.78 (d, J=11.7 Hz, 2H), 7.2 to 7.6 (m, 12H)

[Chemical treatment of ion exchange layered silicate]
In a 5-liter separable flask equipped with an agitator and a reflux unit, 500 g of ion-exchanged water was charged, 249 g (5.93 mol) of lithium hydroxide monohydrate was further charged, and the mixture was stirred.

Separately, 581 g (5.93 mol) of sulfuric acid was diluted with 500 g of ion-exchanged water, and the foregoing lithium hydroxide aqueous solution was then added dropwise thereto using a dropping funnel. Next, 350 g of commercially available granulated montmorillonite (Benclay SL, manufactured by Mizusawa Industrial Chemicals, Ltd., mean particle size: 28.0 μm) was added, followed by stirring. Thereafter, the temperature was raised to 108° C. over 30 minutes, and heat treatment was carried out for 150 minutes. After the treatment, the resulting mixture was cooled to 50° C. over one hour. This slurry was subjected to filtration in vacuo using a nutsche filter and a device having an aspirator and a suction bottle connected thereto. A cake was recovered, to which was then added 5.0 L of pure water to form a slurry again, followed by filtration. This operation was further repeated four times. In any case, the filtration was completed within several minutes. An ultimate washing (filtrate) had a pH of 5.

The recovered cake was dried at 110° C. through the night in a nitrogen atmosphere. As a result, 275 g of a chemically treated material was obtained. As a result of analysis of the composition by fluorescent X-rays, molar ratios of the constitutional elements against silicon as the major component were Al/Si=0.21, Mg/Si=0.046, and Fe/Si=0.022, respectively.

[Preparation of catalyst/preliminary polymerization]
The following operation was carried out under an inert gas using deoxidized and dehydrated solvent and monomer. The previously produced chemically treated ion exchange layered silicate granules were dried in vacuo at 200° C. for 4 hours.

In a round bottom flask having an inner volume of 1 L, 10 g of the above-obtained chemically treated montmorillonite was introduced, 450 mL of heptane and 42 mL (0.025 mol) of a heptane solution of triethylaluminum (0.6 mmol/mL) were charged over 30 minutes, and the mixture was stirred at 25° C. for one hour. Thereafter, the slurry was subjected to stationary sedimentation, and 400 mL of a supernatant was discharged, washed twice with 500 mL of heptane, and then adjusted while discharging heptane such that the whole amount of heptane ultimately became 100 mL.

Next, 0.25 g (0.3 mol) of dichloro{1,1'-methylsilylene-bis[2-ethyl-4-(3-chloro-4-tert-butylphenyl)-4H-azulenyl]

}hafnium and 516 mL of heptane were charged, and after well stirring, 84 mL (11.8 g) of a heptane solution of triisobutylaluminum (140 mg/mL) was added thereto at room temperature, followed stirring for 60 minutes.

Subsequently, the resulting solution was introduced into the montmorillonite previously prepared in the autoclave, and the mixture was stirred for 60 minutes. Further, heptane was introduced such that the whole volume became 5 L, and the mixture was kept at 30° C.

Propylene was introduced thereinto at a constant rate of 100 g/hr at 40° C. for 4 hours, and subsequently, the mixture was kept at 50° C. for 2 hours. A preliminarily polymerized catalyst slurry was recovered by a siphon, and after removing a supernatant, the residue was dried in vacuo at 40° C. According to this operation, a preliminarily polymerized catalyst containing 2.0 g of polypropylene per gram of the catalyst was obtained.

[Polymerization]

Polymerization was carried out in the same manner as in Example 1, except using the foregoing preliminarily polymerized catalyst in an amount of 55 mg reduced as the solid catalyst component.

The propylene based block copolymer was compounded with compounding components in compounding proportions (% by weight) of 0.10% by weight of IRGANOX 1010 (manufactured Ciba Speciality Chemicals), 0.10% by weight of IRGAFOS 168 (manufactured by Ciba Speciality Chemicals), and 0.05% by weight of calcium stearate, and the mixture was kneaded and granulated by a uniaxial extruder to obtain a resin block copolymer in the pellet form.

The resulting block copolymer pellets were introduced into a heated injection molding machine at a mold temperature of 40° C. and a cylinder temperature of 220° C., to form a specimen by injection molding. The resulting injection molded specimen was measured with respect to flexural modulus, Izod impact strength and Heat deflection temperature by the foregoing methods. Further, the generation distance of a flow mark was measured according to the foregoing method.

The results of the respective Examples and Comparative Examples are shown together in Table 1—1, Table 1-2 and Table 1-3. Incidentally, the term "nd" in the tables means that the detection was impossible.

TABLE 1-1

|  |  | Example 1 | Example 2 | Comparative Example 1 | Comparative Example 2 |
|---|---|---|---|---|---|
| MFR | g/10 min | 30.6 | 30 | 27.6 | 29 |
| Propylene content of portion insoluble in ODCB at 100° C. | % by weight | 100.0 | 100.0 | 100.0 | 99.3 |
| G value | % by weight | 25.9 | 44.8 | 35.3 | 33.5 |
| EP content | % by weight | 15.2 | 15.4 | 18.6 | 17.8 |
| Q value of fraction 3 |  | 2.44 | 2.48 | 2.10 | 2.61 |
| α/β of fraction 3 |  | 1.12 | 1.10 | 0.96 | 1.18 |
| Melting point | ° C. | 157.3 | 157.2 | 152.5 | 154.9 |
| 2,1-Bond content | % by mole | 0.25 | 0.24 | 0.1 | 0.26 |
| 1,3-Bond content | % by mole | 0.32 | 0.31 | nd | 0.30 |
| Sum of 2,1-bond content and 1,3-bond content | % by mole | 0.57 | 0.55 | 0.1 | 0.56 |
| Flexural modulus | MPa | 1100 | 1100 | 850 | 885 |
| Izod impact strength at −30° C. | Kj/m$^2$ | 2.5 | 3.4 | 2.3 | 2.7 |
| Heat deflection temperature | ° C. | 113.0 | 113.2 | 102.5 | 103 |
| Appearance of flow mark |  | ○ | ○ | X | ○ |

TABLE 1-2

|  |  | Example 3 | Comparative Example 3 | Example 4 | Comparative Example 4 |
|---|---|---|---|---|---|
| MFR | g/10 min | 5.2 | 4.9 | 73.8 | 75.0 |
| Propylene content of portion insoluble in ODCB at 100° C. | % by weight | 100.0 | 100.0 | 100.0 | 100.0 |
| G value | % by weight | 36.3 | 38.1 | 22.7 | 23 |
| EP content | % by weight | 8.6 | 8.1 | 37.8 | 39.8 |
| Q value of fraction 3 |  | 2.85 | 2.20 | 2.45 | 2.00 |
| α/β of fraction 3 |  | 1.20 | 0.98 | 1.07 | 0.91 |
| Melting point | ° C. | 157.9 | 152.0 | 158.2 | 152.8 |
| 2,1-Bond content | % by mole | 0.25 | 0.1 | 0.26 | 0.1 |
| 1,3-Bond content | % by mole | 0.31 | nd | 0.31 | nd |
| Sum of 2,1-bond content and 1,3-bond content | % by mole | 0.56 | 0.1 | 0.57 | 0.1 |
| Flexural modulus | MPa | 1270 | 1100 | 540 | 410 |
| Izod impact strength at −30° C. | KJ/m$^2$ | 2.0 | 1.8 | 9.8 | 8.1 |
| Heat deflection temperature | ° C. | 116.8 | 107.4 | 100.2 | 90.7 |
| Appearance of flow mark |  | Δ | X | ○ | Δ |

TABLE 1-3

|  |  | Example 5 | Example 6 | Example 7 | Comparative Example 5 | Comparative Example 6 | Example 8 |
|---|---|---|---|---|---|---|---|
| MFR | G/10 min | 32 | 25 | 31 | 30.5 | 34.9 | 30.4 |
| Propylene content of portion insoluble in ODCB at 100° C. | % by weight | 100.0 | 100.0 | 100.0 | 100.0 | 100.0 | 100.0 |
| G value | % by weight | 26 | 35.6 | 62.1 | 61.1 | 35.6 | 27.0 |
| EP content | % by weight | 15.9 | 17.5 | 20.1 | 22.5 | 19.8 | 18.7 |
| Q value of fraction 3 |  | 2.59 | 2.62 | 2.48 | 2.10 | 2.77 | 2.74 |
| α/β of fraction 3 |  | 1.19 | 1.21 | 1.15 | 0.95 | 1.05 | 1.26 |
| Melting point | ° C. | 157.4 | 157.3 | 157.3 | 152.5 | 163.2 | 159.7 |
| 2,1-Bond content | % by mole | 0.26 | 0.25 | 0.25 | 0.1 | nd | 0.13 |
| 1,3-Bond content | % by mole | 0.32 | 0.34 | 0.32 | nd | nd | 0.15 |
| Sum of 2,1-bond content and 1,3-bond content | % by mole | 0.58 | 0.59 | 0.57 | 0.1 | nd | 0.28 |
| Flexural modulus | MPa | 1080 | 1050 | 920 | 760 | 910 | 1080 |
| Izod impact strength at −30° C. | kJ/m$^2$ | 2.7 | 3.6 | 4.8 | 3.4 | 2.5 | 3.5 |
| Heat deflection temperature | ° C. | 113.0 | 112.7 | 110.3 | 100.6 | 106.2 | 115.7 |
| Appearance of flow mark |  | ○ | ○ | ○ | X | ○ | ○ |

INDUSTRIAL APPLICABILITY

In the case where the propylene based block copolymer of the invention is used as a molding material, it exhibits an extremely good stiffness-impact resistance balance and has good heat resistance and excellent moldability, and therefore, in molding, good appearance is revealed.

What is claimed is:

1. A propylene based block copolymer obtained through a preceding stage step of producing a propylene polymer component (PP) and a subsequent stage step of producing a propylene-ethylene copolymer component (EP), using a metallocene catalyst, wherein the block copolymer satisfies the following requisites (1) to (6):

(1) a melt flow rate (MFR) is from 0.1 to 150 g/10 min;

(2) a component that is insoluble in orthodichlorobenzene at 100° C. and soluble in orthodichlorobenzene at 140° C. has a propylene content of 99.5% by weight or more;

(3) the content of the propylene-ethylene copolymer component (EP) in the propylene based block copolymer is from 5 to 50% by weight;

(4) the ethylene content (G) of EP is from 15 to 65% by weight;

(5) when a ratio of a weight average molecular weight (Mw) to a number average molecular weight (Mn) of a highly crystalline polypropylene component in the propylene based block copolymer as determined by a cross fractionation method is defined as a Q value, a common logarithm of a molecular weight corresponding to a peak position of a molecular weight distribution curve of the highly crystalline polypropylene component is defined as P, common logarithms of molecular weights at positions of a 5% height of the peak height are defined as L and H (wherein L means a lower molecular weight side than the peak molecular weight, and H means a higher molecular weight side of the peak molecular weight), respectively, and α and β are defined as (α=H−P) and (β=P−L), respectively, the Q value and α/β satisfy the following relation:

a) (Q value)≧2.3, and b) α/β≧0.4×(Q value); and (6) the block copolymer has a melting point of 157° C. or higher.

2. The propylene based block copolymer according to claim 1, wherein the sum of the 2,1-bond content and the 1,3-bond content in the component that is insoluble in orthodichlorobenzene at 100° C. and soluble in orthodichlorobenzene at 140° C. is from 0.06 to 0.6% by mole.

3. The propylene based block copolymer according to claim 1, wherein the 1,3-bond content in the component that is insoluble in orthodichlorobenzene at 100° C. and soluble in orthodichlorobenzene at 140° C. is from 0.06 to 0.6% by mole.

* * * * *